(12) United States Patent
Sato et al.

(10) Patent No.: US 11,457,158 B2
(45) Date of Patent: Sep. 27, 2022

(54) LOCATION ESTIMATION DEVICE, LOCATION ESTIMATION METHOD, AND PROGRAM RECORDING MEDIUM

(71) Applicant: NEC Corporation, Tokyo (JP)

(72) Inventors: Yoshiaki Sato, Tokyo (JP); Noriyoshi Hiroi, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 279 days.

(21) Appl. No.: 16/633,304

(22) PCT Filed: Jul. 27, 2017

(86) PCT No.: PCT/JP2017/027167
§ 371 (c)(1),
(2) Date: Jan. 23, 2020

(87) PCT Pub. No.: WO2019/021412
PCT Pub. Date: Jan. 31, 2019

(65) Prior Publication Data
US 2020/0154023 A1 May 14, 2020

(51) Int. Cl.
*H04N 5/238* (2006.01)
*B64C 39/02* (2006.01)
*H04N 5/235* (2006.01)

(52) U.S. Cl.
CPC ........... *H04N 5/238* (2013.01); *B64C 39/024* (2013.01); *H04N 5/2351* (2013.01); *B64C 2201/123* (2013.01)

(58) Field of Classification Search
CPC .... H04N 5/238; H04N 5/2351; H04N 5/2353; H04N 5/243; H04N 19/54; B64C 39/024;
(Continued)

(56) References Cited

U.S. PATENT DOCUMENTS

2001/0055063 A1 12/2001 Nagai et al.
2009/0175498 A1* 7/2009 Kochi ..................... G06T 7/579
382/103
(Continued)

FOREIGN PATENT DOCUMENTS

JP 2002-048513 A 2/2002
JP 2002-185867 A 6/2002
(Continued)

OTHER PUBLICATIONS

International Search Report for PCT Application No. PCT/JP2017/027167, dated Sep. 26, 2017.
(Continued)

*Primary Examiner* — Luong T Nguyen
(74) *Attorney, Agent, or Firm* — Sughrue Mion, PLLC

(57) ABSTRACT

In order to provide a technique for improving precision of location estimation using a video, a location estimation device includes: a video processing unit that executes video processing including location estimation of an imaging unit, based on a plurality of feature points extracted from a video captured by the imaging unit and composed of a plurality of frames; and an imaging control unit that determines, on the basis of video-related information acquired in the video processing on a first frame belonging to a first group out of the plurality of frames, an exposure condition of the imaging unit in a second frame belonging to a second group different from the first group out of the plurality of frames.

9 Claims, 13 Drawing Sheets

(58) Field of Classification Search
CPC .... B64C 2201/123; G06T 2207/10144; G06T 2207/10016; G06T 2207/10032; G06T 2207/20208; G06T 2207/30244; G06T 2207/30252; G06T 5/009; G06T 5/40; G06T 5/50; G06T 7/579
See application file for complete search history.

(56) References Cited

U.S. PATENT DOCUMENTS

| | | | |
|---|---|---|---|
| 2014/0107971 A1* | 4/2014 | Engedal | B66C 13/04 |
| | | | 702/150 |
| 2015/0222799 A1* | 8/2015 | Noorkami | H04N 5/2352 |
| | | | 348/223.1 |
| 2017/0078550 A1* | 3/2017 | Terasawa | H04N 5/2352 |

FOREIGN PATENT DOCUMENTS

| | | |
|---|---|---|
| JP | 2003-304417 A | 10/2003 |
| JP | 2009-237845 A | 10/2009 |
| JP | 2015-144475 A | 8/2015 |

OTHER PUBLICATIONS

English translation of Written opinion for PCT Application No. PCT/JP2017/027167.

* cited by examiner

Fig. 13

| SELF-LOCATION | | | | ✗ | |
|---|---|---|---|---|---|
| FRAME NUMBER | F1 | F2 | F3 | F4 | F5 |
| EXPOSURE AMOUNT | E1 | E2 | E3 | E4 | E5=E3 |

Fig. 14

| SELF-LOCATION | P1 BF | P2 DF | P3 BF | P4 DF | P5 BF |
|---|---|---|---|---|---|
| FRAME NUMBER | F1 | F2 | F3 | F4 | F5 |

LOCATION ESTIMATION DEVICE, LOCATION ESTIMATION METHOD, AND PROGRAM RECORDING MEDIUM

This application is a National Stage Entry of PCT/JP2017/027167 filed on Jul. 27, 2017, the contents of all of which are incorporated herein by reference, in their entirety.

TECHNICAL FIELD

The present disclosure relates to location estimation using a video.

BACKGROUND ART

For movement of an unmanned aerial vehicle (UAV), a self-driving car, a robot, and the like, it may be necessary to estimate a so-called self-location, that is, a location of a moving object. As a technique for estimating the self-location, for example, a simultaneous localization and mapping (SLAM) technique is known (for example, see PTL 1). Among techniques for SLAM, particularly, the SLAM based on a video is also called visual SLAM. However, hereinafter, the visual SLAM may be also referred to simply as the SLAM.

Further, in a still image, synthesis for the purpose of image expression with a wide dynamic range, that is, high dynamic range (HDR) imaging is known (for example, see PTL 2). The HDR imaging is a technique of acquiring an image with a wide dynamic range, by capturing an image of an identical scene a plurality of times with various exposure amounts and synthesizing a plurality of images.

CITATION LIST

Patent Literature

[PTL 1] Japanese Unexamined Patent Application Publication No. 2009-237845
[PTL 2] Japanese Unexamined Patent Application Publication No. 2015-144475

SUMMARY OF INVENTION

Technical Problem

Also in location estimation using SLAM, a blown-out highlight or a blocked-up shadow due to an insufficient dynamic range may decrease precision of estimation. For example, when many blown-out highlights or blocked-up shadows are generated in a video, a possibility of failing in location estimation increases because a sufficient number of feature points cannot be extracted. Further, in the case of estimating a self-location of a moving object, it is difficult to capture an image of an identical scene a plurality of times, because the location of the object itself may change from moment to moment. Therefore, in the case of estimating a self-location of a moving object, there exists a technical problem that it is difficult to apply HDR imaging in a still image as described above.

In light of the above-described problem, an exemplary object of the present disclosure is to provide a technique for improving precision of location estimation using a video.

Solution to Problem

According to one aspect, a location estimation device is provided, the location estimation device including: video processing means for executing video processing including location estimation of imaging means based on a plurality of feature points extracted from a video, the video being captured by the imaging means and composed of a plurality of frames; and imaging control means for determining, based on video-related information acquired in the video processing on a first frame belonging to a first group out of the plurality of frames, an exposure condition of the imaging means in a second frame belonging to a second group out of the plurality of frames, the second group being different from the first group.

According to another aspect, a location estimation method is provided, the location estimation method including: executing video processing including location estimation of imaging means based on a plurality of feature points extracted from a video, the video being captured by the imaging means and composed of a plurality of frames; and determining, based on video-related information acquired in the video processing on a first frame belonging to a first group out of the plurality of frames, an exposure condition of the imaging means in a second frame belonging to a second group out of the plurality of frames, the second group being different from the first group.

According to still another aspect, a computer-readable program recording medium is provided, the computer-readable program recording medium recording a program for causing a computer to execute: a step of executing video processing including location estimation of imaging means based on a plurality of feature points extracted from a video, the video being captured by the imaging means and composed of a plurality of frames; and a step of determining, based on video-related information acquired in the video processing on a first frame belonging to a first group out of the plurality of frames, an exposure condition of the imaging means in a second frame belonging to a second group out of the plurality of frames, the second group being different from the first group.

Advantageous Effects of Invention

The present disclosure improves precision of location estimation using a video.

BRIEF DESCRIPTION OF DRAWINGS

FIG. 13 is a diagram illustrating one example of a procedure of setting an exposure amount when SLAM processing is failed.

FIG. 14 is a diagram illustrating one example of an error in a self-location due to an exposure amount.

EXAMPLE EMBODIMENT

First Example Embodiment

Figure 1:
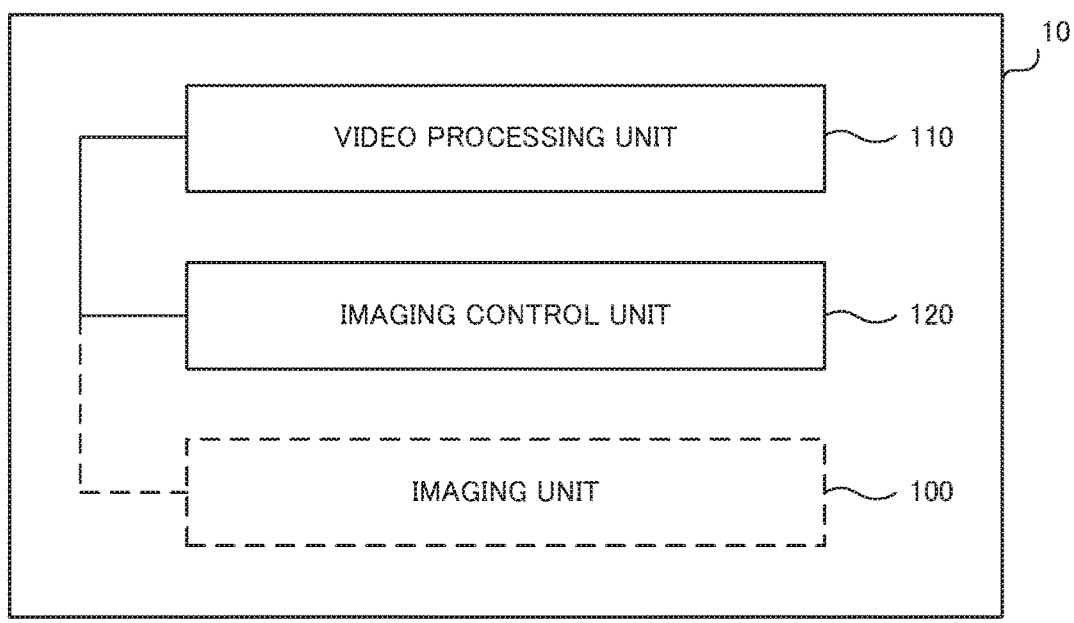
FIG. 1 is a block diagram illustrating one example of a configuration of a location estimation device.

FIG. 1 is a block diagram illustrating a configuration of a location estimation device 10 according to one example embodiment. The location estimation device 10 includes at least a video processing unit 110 and an imaging control unit 120. The video processing unit 110 and the imaging control unit 120 are implemented by using, for example, one or more processors and one or more memories. The location estimation device 10 may further include an imaging unit 100. However, the imaging unit 100 may be included in a device different from the location estimation device 10. The imaging unit 100 is connected with the video processing unit 110 and the imaging control unit 120 wiredly or wirelessly.

The location estimation device 10 is an information processing device for estimating a location (hereinafter, also referred to as an "imaging location") of the imaging unit 100 in a three-dimensional real space. When the location estimation device 10 includes the imaging unit 100, the imaging location described herein can be rephrased as a self-location. In other words, the self-location in this case is a location where the location estimation device 10 is present.

The imaging unit 100 generates video data indicating a captured video. The imaging unit 100 is configured to include an imaging element such as a complementary metal-oxide-semiconductor (CMOS) sensor. The imaging unit 100 is, typically, a so-called video camera. According to the present example embodiment, the imaging unit 100 is mounted on a moving object such as an automobile or an unmanned aerial vehicle (UAV). Thus, an imaging range of the imaging unit 100, that is, a scene captured by the imaging unit 100, may change from moment to moment. However, the video processing unit 110 and the imaging control unit 120 are not necessarily mounted on this moving object, and may be configured to, for example, wirelessly communicate with the object.

The video according to the present example embodiment is composed of a plurality of frames. In other words, the video includes a plurality of images (still images) captured at predetermined time intervals. The video has a frame rate of, for example, but not necessarily limited to, 30 frames per second (fps) or more. Further, the frame rate according to the present example embodiment may be any of a constant frame rate (CFR) and a variable frame rate (VFR). Further, the video according to the present example embodiment also has unlimited resolution (that is, the number of pixels per screen), regardless of whether the video is monochromic or colored. However, hereinafter, it is assumed that the video is monochromatic, for convenience of description.

The imaging unit 100 is able to generate video data at a predetermined frame rate. In other words, the video data include a plurality of images captured at different timings. The imaging unit 100 supplies such video data to the video processing unit 110. Further, the imaging unit 100 executes imaging under an exposure condition determined by the imaging control unit 120 (described later in detail).

The video processing unit 110 executes video processing on the video data generated by the imaging unit 100. According to the present example embodiment, the video processing executed by the video processing unit 110 includes at least processing of estimating an imaging location on the basis of the video captured by the imaging unit 100. Hereinafter, this processing will be also referred to as "location estimation (localization)". Further, the video processing unit 110 may execute mapping (generation of map information) to be described later, on the basis of the video captured by the imaging unit 100.

In some cases, the video processing unit 110 executes the location estimation and the mapping by using SLAM. In this case, the video processing unit 110 executes the location estimation and the mapping on the basis of a feature point extracted from the video. In this case, the map information generated by the mapping indicates a location relationship among a plurality of feature points. The map information is, specifically, information representing, for each feature point, three-dimensional coordinates of a feature point and a feature amount thereof. In other words, the map information is information indicating what feature point is present at which location in a real space. Further, the video processing unit 110 is able to update the map information, since the imaging unit 100 executes imaging while moving. The updating described herein indicates adding new information to the map information.

The feature point is a point characterizing an image. The feature point is, for example, a portion of an image indicating a characteristic luminance change, and is, typically, a portion having a steep luminance change. As one example of the feature point, a so-called edge or corner can be exemplified. As the feature point according to the present example embodiment, a feature point extracted on the basis of any of well-known feature amounts, such as scale-invariant feature transform (SIFT), speeded up robust features (SURF), and histograms of oriented gradients (HOG), are available. The feature point according to the present example embodiment is, typically, a robust feature point against a change in luminance or illumination. Further, it is assumed that the video according to the present example embodiment is a video from which a sufficient number of feature points necessary for location estimation and the like can be extracted.

The imaging control unit 120 controls imaging performed by the imaging unit 100. The imaging control unit 120 determines, for example, an exposure condition at a time of imaging performed by the imaging unit 100. The exposure condition described herein may include an exposure amount, an exposure time, a shutter speed, an aperture, a gain, and the like. In addition to a general automatic exposure function, the imaging control unit 120 is able to determine the exposure condition on the basis of information (hereinafter, also referred to as "video-related information") acquired from the video processing unit 110. The video-related information is, for example, information (hereinafter, also referred to as "luminance information") specified by using the video captured by the imaging unit 100 and relating to luminance of the video.

More specifically, the imaging control unit 120 determines, on the basis of the video-related information acquired in the video processing executed by the video processing unit 110 on a frame belonging to a first group, an exposure condition in a frame belonging to a second group different from the first group. Further, the imaging control unit 120 may determine, on the basis of the video-related information acquired in the video processing on a frame belonging to the second group, an exposure condition in a frame belonging to the first group.

According to the present example embodiment, frames included in video data are classified into either a "bright frame (BF)" or a "dark frame (DF)". The BF and the DF are equivalent to one example of the first group and the second group described above. The first group is equivalent to either one of the BF and the DF, and the second group is equivalent to another one of the BF and the DF.

The BF is a frame captured to be brighter than the DF. For example, the BF has a larger exposure amount of each pixel than the DF. In other words, it can be also said that the BF is captured under an exposure condition where a so-called "blown-out highlight (a state with significantly deteriorated gradation due to excessive light amount for an imaging element)" is more likely to be generated than in the DF. Further, it can be said that the DF is captured under an exposure condition where a so-called "blocked-up shadow (a state with significantly deteriorated gradation due to insufficient light amount for an imaging element)" is more likely to be generated than in the BF. However, the BF (or the DF) described herein is merely relatively brighter (or darker) than another, and absolute brightness thereof is not limited to a particular range.

Figure 2:
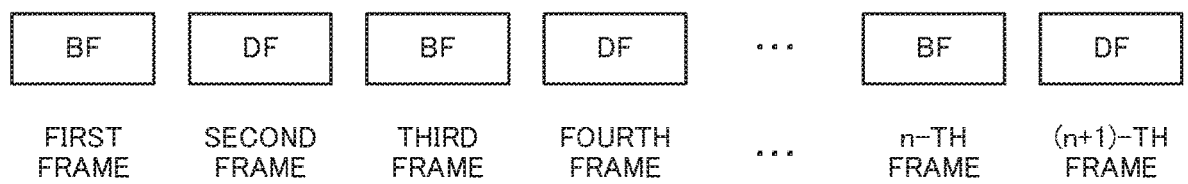
FIG. 2 is a diagram illustrating one example of bright frames (BFs) and dark frames (DFs) in a video.

FIG. 2 is a diagram illustrating one example of BFs and DFs in a video. In some cases, a BF and a DF are included alternately in a video. For example, in the video exemplified in FIG. 2, the first, third, fifth, . . . , and n-th frames are BFs, and the second, fourth, sixth, . . . , and (n+1)-th frames are DFs. Herein, n is an integer (odd number) of 1 or more.

In the case of FIG. 2, the video includes BFs and DFs repeatedly, like a BF followed by a DF, and the DF followed by another BF. However, the BF and the DF are not necessarily included alternately in the video. For example, the video may include several frames of BFs in succession, followed by several frames of DFs in succession. Further, the BFs and the DFs do not need to be included in the video at equal proportions.

The imaging control unit 120 is able to determine the exposure condition at a time of capturing a frame belonging to the second group, on the basis of the luminance information relating to a frame belonging to the first group. In other words, the imaging control unit 120 is able to determine the exposure condition of a certain frame on the basis of the luminance information relating to a frame that belongs to a group different from the frame and has been captured prior to the frame.

For example, in the case of FIG. 2, the imaging control unit 120 may determine the exposure condition at a time of capturing the (n+1)-th frame, on the basis of the luminance information relating to the n-th frame. Alternatively, the imaging control unit 120 may determine the exposure condition at a time of capturing the (n+3)-th frame, on the basis of the luminance information relating to the n-th frame. A frame of which the exposure condition is determined by the imaging control unit 120 and a frame of which the luminance information for determining the exposure condition is acquired are not necessarily continuous, as long as the frames belong to different groups. Hereinafter, the frame of which the luminance information for determining the exposure condition is acquired will be also referred to as a "first frame", and the frame of which the exposure condition is determined by the imaging control unit 120 will be also referred to as a "second frame".

The imaging control unit 120 acquires the luminance information for determining the exposure condition from the video processing unit 110. According to the present example embodiment, the luminance information is information relevant to luminance of one or a plurality of pixels included in an image. In some cases, the luminance information indicates a luminance value of one or a plurality of pixels. For example, the luminance information may be a luminance value of a feature point in an image, or may be information (a histogram of luminance values of a plurality of feature points) acquired on the basis of a luminance value of a feature point. Note that the "luminance" described herein includes both of an absolute luminance and a relative luminance to be described later.

In some cases, the imaging control unit 120 determines the exposure condition of the second frame in such a way that a plurality of identical feature points are extracted from the first frame and the second frame. In this case, it is assumed that the first frame and the second frame include (reflect) an identical feature point (that is, an identical location in a real space) within imaging ranges thereof.

Figure 3:
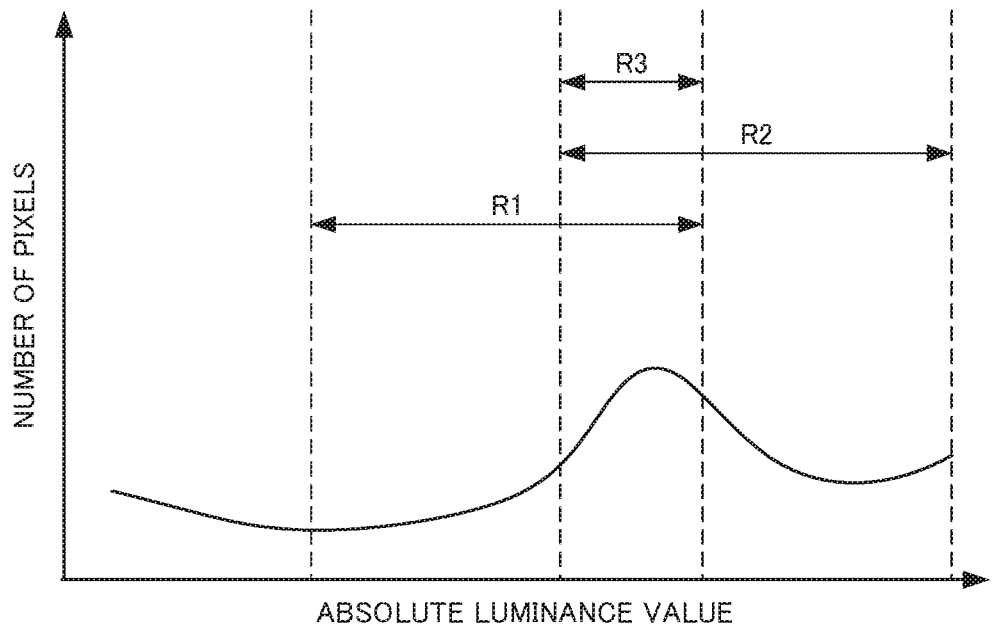
FIG. 3 is a schematic diagram illustrating one example of a histogram indicating distribution of feature points that may be extracted from a captured image of a certain subject, with respect to an absolute luminance value.

FIG. 3 is a schematic diagram illustrating one example of a histogram indicating distribution of feature points that may be extracted from a captured image of a certain subject, with respect to an absolute luminance value. In this histogram, the horizontal axis indicates an absolute luminance value calculated on the basis of a relative luminance value of a feature point, and the vertical axis indicates frequency of a feature point, that is, the number of pixels. Herein, the absolute luminance indicates brightness of an object surface to be imaged. The absolute luminance value is a value acquired by quantifying this absolute luminance in accordance with a predetermined criterion. For the sake of convenience, the absolute luminance may be considered equivalent to illumination. Thus, the absolute luminance value may be represented in lux, that is, lumen per square meter, for convenience. Note that, herein, the greater absolute luminance value indicates a brighter state.

The imaging unit 100 captures an image of a subject represented by using such a histogram, in a fixed dynamic range. However, since the dynamic range of the imaging unit 100 is a finite range, it is not possible to record all feature points that may be extracted from the subject. The luminance value of each pixel captured by the imaging unit 100 will be hereinafter referred to as a "relative luminance value". Further, the relative brightness of each pixel represented by the relative luminance value will be hereinafter referred to as "relative luminance".

The relative luminance value is different from the absolute luminance value indicating brightness of an object itself to be imaged, in that the relative luminance value is a luminance value of each pixel when a certain object is imaged under a specific exposure condition. In other words, the relative luminance value described herein depends on brightness of an object itself and an exposure condition at a time of imaging. When the imaging unit 100 outputs an 8-bit image, the relative luminance value is represented by a dimensionless quantity of 0 to 255 (that is, 256 gradations).

Herein, the greater relative luminance value indicates a brighter state, similarly to the absolute luminance value.

The absolute luminance value can be calculated on the basis of the relative luminance value of an image captured under a certain exposure condition and the exposure condition at a time of capturing the image. The absolute luminance value may be calculated on the basis of a predetermined function using the relative luminance value and an exposure amount as variables. The absolute luminance value can be also calculated, for example, as follows.

Herein, when the absolute luminance value of the DF is denoted by $L_D$, and the relative luminance value of the DF is denoted by $I_D$, $L_D$ and $I_D$ satisfy the following equation (1). Herein, $\gamma$ is a predetermined constant. $\gamma$ is, for example, but not limited to, "½.4($\approx$0.42)". Further, it is assumed herein that $I_D$ is a numerical value normalized to be 0 (the minimum value) to 1 (the maximum value). When the imaging unit 100 outputs an 8-bit image, $I_D$ is calculated by dividing an output value by "255".

$$I_D = (L_D)^\gamma \quad (1)$$

Further, when the absolute luminance value of the BF is denoted by $L_B$, and the relative luminance value of the BF is denoted by $I_B$, $L_B$ and $I_B$ satisfy the following equation (2). Herein, $\gamma$ is a constant similar to equation (1). Further, it is assumed that $I_B$ is a numerical value normalized to be 0 to 1, similarly to $I_D$.

$$I_B = (L_B)^\gamma \quad (2)$$

Note that, when an identical scene is captured with different exposure amounts, the absolute luminance value and the exposure amount satisfy the following equation (3). Herein, $K_D$ denotes the exposure amount of the DF. Further, $K_B$ denotes the exposure amount of the BF. Then, equation (1) can be transformed as in equation (4) by using equation (2) and equation (3).

$$\frac{L_D}{K_D} = \frac{L_B}{K_B} \quad (3)$$

$$I_D = (L_D)^\gamma = \left(K_D \frac{L_B}{K_B}\right)^\gamma = \left(\frac{K_D}{K_B}\right)^\gamma (L_B)^\gamma = \left(\frac{K_D}{K_B}\right)^\gamma I_B \quad (4)$$

Alternatively, $I_D$ and $I_B$ can be also represented approximately as in the following equation (5). Herein, a and b are coefficients defined by a characteristic and the like of the imaging unit 100.

$$I_D = aI_B + b \quad (5)$$

In FIG. 3, a luminance range when the imaging unit 100 captures an image under a first exposure condition is denoted by R1, and a luminance range when the imaging unit 100 captures an image under a second exposure condition is denoted by R2. For example, when an image is captured under the first exposure condition, a portion of a subject having an absolute luminance value greater than an upper limit value of the luminance range R1 uniformly indicates a maximum relative luminance value in the image. In other words, this portion in the image has a blown-out highlight. On the other hand, when an image is captured under the second exposure condition, a portion of a subject having an absolute luminance value lower than a lower limit value of the luminance range R2 uniformly indicates a minimum relative luminance value in the image. In other words, this portion in the image has a blocked-up shadow. It is difficult to extract a feature point from an area where a blown-out highlight or a blocked-up shadow is generated, that is, an area where no significant change in gradation occurs.

For an area of an image having a relative luminance value falling within a range of the luminance ranges R1 and R2, gradation is reproduced in individual captured images, although the images have different relative luminance values. Therefore, a pixel in a range where the luminance ranges R1 and R2 overlap each other, that is, a range where an absolute luminance value is included in R3 in the drawing is captured without causing any of blown-out highlights or blocked-up shadows, in any of the cases where an image is captured under the first exposure condition and an image is captured under the second exposure condition. Thus, a feature point to be extracted on the basis of the pixel included in the range R3 is extractable from both of the image captured under the first exposure condition and the image captured under the second exposure condition.

Further, two images captured under different exposure conditions may include a portion of which gradation is not reproduced in another image. For example, an image captured under the first exposure condition records gradation of a portion being a blocked-up shadow in an image captured under the second exposure condition. On the other hand, an image captured under the second exposure condition records gradation of a portion being a blown-out highlight in an image captured under the first exposure condition.

From the above, in the example in FIG. 3, an image (hereinafter, also referred to as a "DF image") captured under the first exposure condition and an image (hereinafter, also referred to as a "BF image") captured under the second exposure condition have the following two characteristics. First, the BF image and the DF image include a mutually common feature point, that is, a feature point extractable from both of the images (a feature point having an absolute luminance value within the range R3). Second, the BF image and the DF image include a mutually uncommon feature point, that is, a feature point that is extracted from one image but is not extracted from another image (a feature point having an absolute luminance value equal to or greater than a lower limit value of the luminance range R1 and equal to or less than a lower limit value of the range R3, or equal to or greater than an upper limit value of the range R3 and equal to or less than an upper limit value of the luminance range R2).

These characteristics can strengthen location estimation performed by the video processing unit 110 against a luminance change. For example, when imaging is executed while a plurality of exposure conditions are switched, the video processing unit 110 can reduce a possibility of failing in location estimation because of inability to extract a sufficient number of feature points due to a blown-out highlight or a blocked-up shadow. Further, when imaging is executed while a plurality of exposure conditions are switched, the video processing unit 110 can extract more feature points than in a case where such switching is not performed. This is because switching exposure conditions makes it possible to extract a feature point also from an area from which no feature point can be extracted before switching due to a blown-out highlight or a blocked-up shadow.

In order to enable such location estimation, the imaging control unit 120 determines the exposure condition of the second frame in such a way that the luminance range of the first frame and the luminance range of the second frame partially overlap each other, and that a certain number or more of common feature points can be extracted from both of the frames. In other words, the imaging control unit 120 determines the exposure condition in the second frame in such a way that an area (R3 in FIG. 2) that can be imaged without causing a blocked-up shadow and a blown-out highlight in any of the first frame and the second frame. The imaging control unit 120 refers to the luminance information specified from the BF when determining the exposure condition of the DF, and refers to the luminance information specified from the DF when determining the exposure condition of the BF. In other words, when the first frame is the DF, the second frame is the BF, and, when the first frame is the BF, the second frame is the DF.

The configuration of the location estimation device 10 is as described above. Under this configuration, the location estimation device 10 estimates an imaging location on the basis of video data supplied from the imaging unit 100, and controls imaging performed by the imaging unit 100. Further, the location estimation device 10 may execute location estimation and mapping simultaneously, that is, in parallel.

Figure 4:
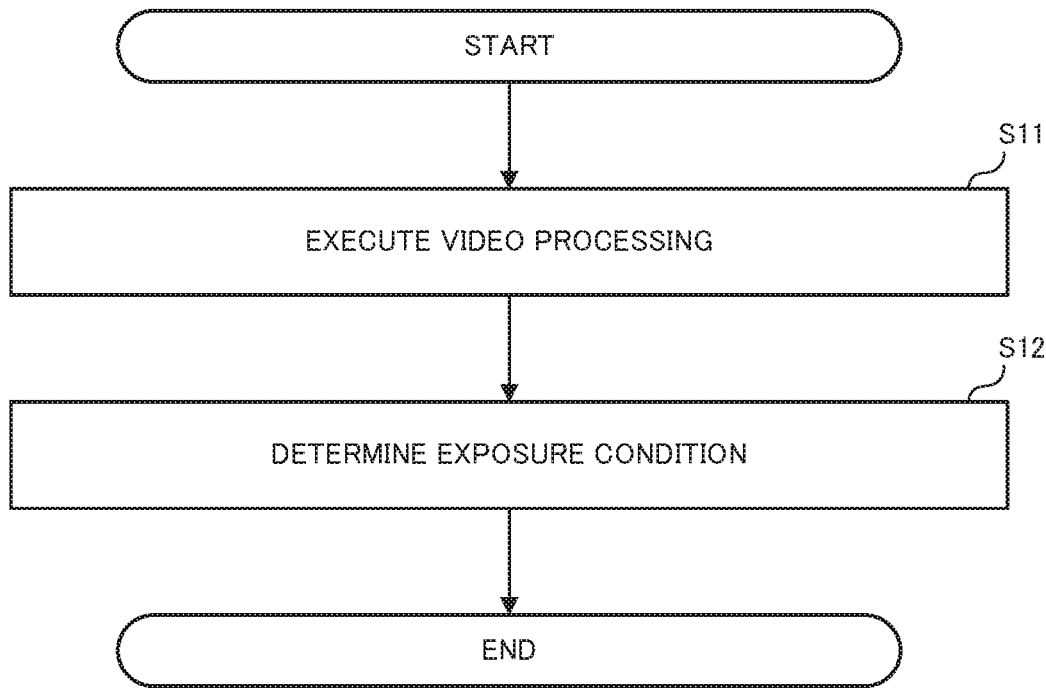
FIG. 4 is a flowchart illustrating one example of an operation of the location estimation device.

FIG. 4 is a flowchart illustrating an operation (particularly, an operation relating to control of the exposure condition) of the location estimation device 10. The location estimation device 10 repeatedly executes Steps S11 and S12 when video data are generated by the imaging unit 100.

In Step S11, the video processing unit 110 executes predetermined video processing. At this time, the video processing unit 110 executes at least location estimation based on a video captured by the imaging unit 100. The video processing unit 110 estimates an imaging location on the basis of a feature point extracted from the video captured by the imaging unit 100. The location estimation in Step S11 is executed by using, for example, a well-known SLAM technique.

In Step S12, the imaging control unit 120 determines an exposure condition to be applied to the imaging unit 100. More specifically, the imaging control unit 120 determines the exposure condition of the imaging unit 100 in the second frame on the basis of video-related information (luminance information or the like) acquired in the video processing on the first frame. The imaging unit 100 executes imaging of the second frame according to the exposure condition determined in Step S12.

The video processing unit 110 executes Step S11 by estimating an imaging location on the basis of a video captured according to the exposure condition determined in Step S12. The video processing unit 110 and the imaging control unit 120 repeatedly execute Steps S11 and S12, while reflecting mutual processing results in this way. Consequently, even when the exposure condition of the BF and the exposure condition of the DF are switched, the exposure condition is determined in such a way that a common feature point is extracted from both of the frames.

As described above, the location estimation device 10 according to the present example embodiment has a configuration of, when frames included in a video are distinguished between the first group and the second group on the basis of the exposure condition, determining, on the basis of video-related information acquired in video processing on the first frame belonging to one group, the exposure condition for the case of capturing the second frame belonging to another group. This configuration makes it possible to extract a common feature point from an image of a frame belonging to the first group and an image of a frame belonging to the second group.

In video-based location estimation such as SLAM, when a sufficient number of feature points cannot be extracted from an image, it is difficult to perform comparison with a known feature point such as already-generated map information. Thus, for example, location estimation using a scene in which many blown-out highlights or blocked-up shadows may be generated, such as a scene with a remarkable temporal or spatial contrast, has a high possibility of decreasing precision of estimation or failing in estimation itself, in comparison with location estimation using a scene other than the above. In contrast to this, the location estimation device 10 according to the present example embodiment can extract a sufficient number of feature points by switching the exposure conditions in a way as described above, in a scene in which many blown-out highlights or blocked-up shadows may be generated. Accordingly, the location estimation device 10 according to the present example embodiment can improve precision of location estimation using a video, in comparison with the case of including no similar configuration.

Second Example Embodiment

Figure 5:
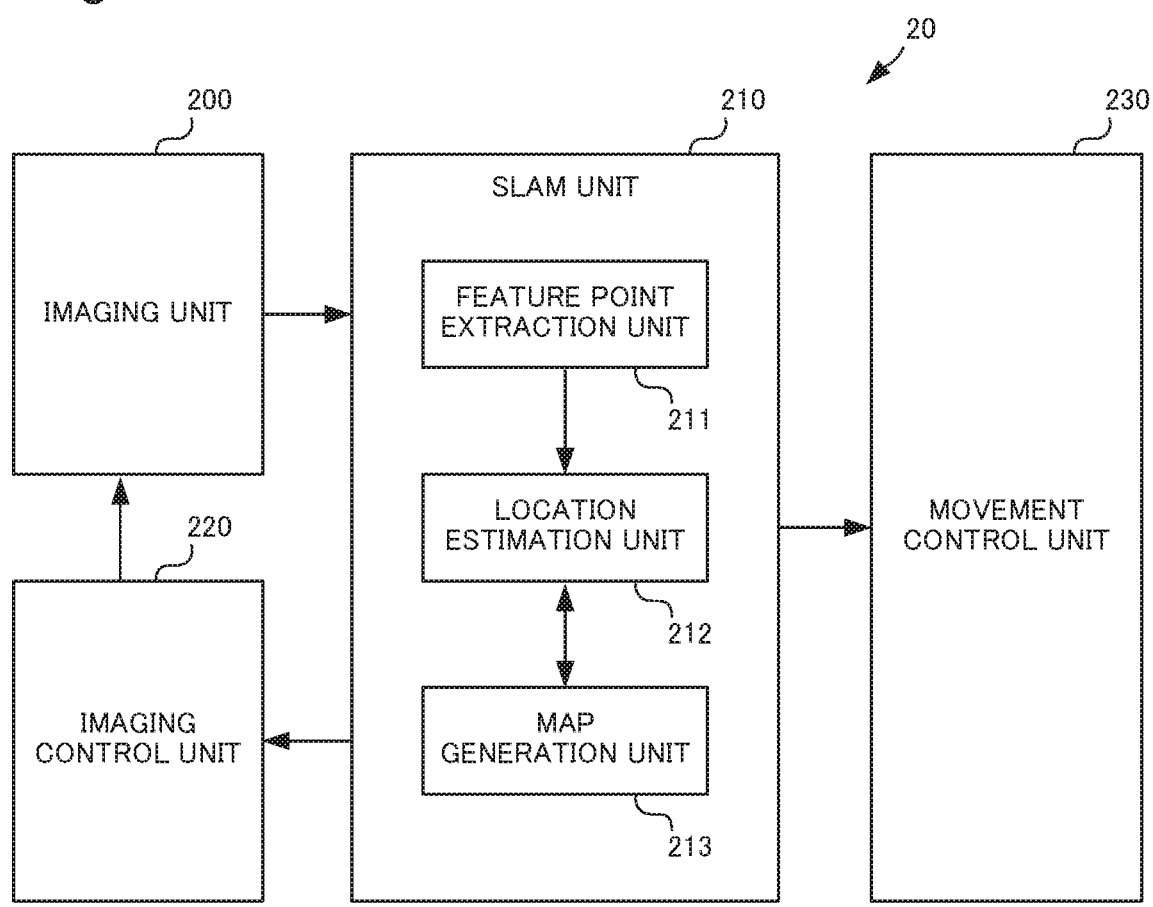
FIG. 5 is a block diagram illustrating one example of a configuration of an autonomous mobile system.

FIG. 5 is a block diagram illustrating a configuration of an autonomous mobile system 20 according to another example embodiment. The autonomous mobile system 20 is a system mounted on a mobile body such as a UAV, an autonomous traveling car, and an autonomous mobile robot. The autonomous mobile system 20 includes an imaging unit 200, a SLAM unit 210, an imaging control unit 220, and a movement control unit 230. Among the above, the imaging unit 200, the SLAM unit 210, and the imaging control unit 220 are equivalent to one example of the location estimation device 10 according to the first example embodiment.

Hereinafter, it is assumed that the autonomous mobile system 20 is mounted on a UAV. In other words, the term "mobile" described herein includes aerial flight. However, without limitation to the UAV, the autonomous mobile system 20 can be also applied to another mobile body. Operations of the imaging unit 200, the SLAM unit 210, and the imaging control unit 220 are not basically different even for a different mobile body.

Note that, in the subsequent example embodiments, an arrow illustrated in a block diagram indicates one example of data flow between blocks, and is not intended to limit the data flow to only a direction of the illustrated arrow. Further, among terms used in the subsequent example embodiments and modification examples, a term used also in the first example embodiment will be used in a meaning similar to the term used in the first example embodiment, except as particularly stated. Further, according to the present example embodiment, it is assumed that a BF and a DF are switched alternately (that is, frame by frame).

The imaging unit 200 generates video data. The imaging unit 200 includes at least an imaging element such as a CMOS sensor, and optical system members such as a lens and a diaphragm. This imaging element is fixedly provided at a particular location on the UAV. The imaging unit 200 supplies video data captured at a predetermined frame rate to the SLAM unit 210.

The SLAM unit 210 executes location estimation and mapping. The SLAM unit 210 estimates a location (hereinafter, also referred to as a "self-location") of the UAV and generates map information, by using a SLAM technique. The SLAM unit 210 includes, more specifically, a feature point extraction unit 211, a location estimation unit 212, and a map generation unit 213. The SLAM unit 210 is equivalent to one example of the video processing unit 110 according to the first example embodiment.

The feature point extraction unit 211 extracts a feature point from a video. The feature point extraction unit 211 extracts the feature point from each frame included in the video data generated by the imaging unit 200. Note that an algorithm of extracting the feature point by the feature point extraction unit 211 is not limited to a particular algorithm. The feature point extraction unit 211 extracts the feature point on the basis of, for example, the above-described feature amount (SIFT, SURF, HOG, or the like).

The location estimation unit 212 estimates a self-location. The location estimation unit 212 estimates, on the basis of the feature point extracted by the feature point extraction unit 211 and map information generated by the map generation unit 213, a location of the UAV, that is, the self-location in a space defined by the map information.

The location estimation performed by the location estimation unit 212 is executed by using a well-known SLAM technique. For example, parallel tracking and mapping for small AR workspaces (PTAM) is available for the location estimation. Note that, according to the present example embodiment, the self-location is substantially the same as an imaging location. Further, the estimation of the self-location described herein may include not only estimation of coordinates, but also estimation of a posture (that is, three-dimensional inclination).

The location estimation unit 212 supplies, to the map generation unit 213, key frame information indicating a result of estimation of a location in a frame (hereinafter, also referred to as a "key frame") being a criterion for location estimation. The key frame information includes location information indicating the self-location in a particular frame and feature point information indicating a location of the feature point in the frame extracted by the feature point extraction unit 211. Note that the key frame is determined from video data as follows.

For example, the key frame is determined on the basis of displacement of the imaging unit 200. The displacement described herein may include both of displacement caused by a translational motion and displacement caused by a rotational motion. Specifically, a certain key frame and a subsequent key frame out of frames composing video data are determined in such a way that an identical area (that is, the same location in a real space) is included in imaging ranges of the key frames. However, it is assumed that the area described herein is an area from which one or a plurality of feature points are extractable. More specifically, when a certain frame out of frames composing video data is a key frame, a next key frame is a frame captured at a point in time when a movement amount of the imaging unit 200 from a point in time when the certain frame is captured is equal to or less than a predetermined threshold value. In other words, in this case, a proportion of key frames in video data of a certain period is higher as a movement amount (that is, a change of the self-location) of the imaging unit 200 in the period is greater, and is lower as the movement amount is smaller. Alternatively, the key frame may be set for video data every several frames (that is, periodically).

The location information is data representing the self-location by using a predetermined coordinate system. For example, the location information can be described by using three components of x, y, and z coordinates in a three-dimensional orthogonal coordinate system, and three components representing inclination (rotation) in each coordinate direction. Further, the feature point information is data representing individual locations of feature points extracted by the feature point extraction unit 211, by using, for example, a three-dimensional orthogonal coordinate system with a predetermined location as an origin. In the feature point information, each feature point can be uniquely specified by a combination of a feature amount and coordinates of the feature point.

The map generation unit 213 generates map information. Specifically, the map generation unit 213 updates existing map information on the basis of the key frame information supplied from the location estimation unit 212. More specifically, the map generation unit 213 compares information on an existing feature point (for example, a feature point specified from previous key frame information) recorded in map information with a feature point specified from latest key frame information, and adds a newly specified feature point to the map information.

At this time, the map generation unit 213 is able to associate feature points captured from different locations with each other, by executing coordinate transformation according to a change (that is, displacement) of the self-location. Specifically, the map generation unit 213 can transform the feature points captured from different locations into coordinates in a common coordinate system. This coordinate transformation can be achieved on the basis of a well-known technique such as homogeneous transformation, and thus, detailed description will be omitted herein.

The imaging control unit 220 controls imaging performed by the imaging unit 200. The imaging control unit 220 determines at least an exposure condition at a time of imaging performed by the imaging unit 200. According to the present example embodiment, the imaging control unit 220 is able to determine the exposure condition by using luminance information supplied from the SLAM unit 210.

For example, the imaging control unit 220 determines the exposure condition by using, as the luminance information, a relative luminance value of the feature point extracted by the feature point extraction unit 211. More specifically, the imaging control unit 220 determines the exposure condition in a DF on the basis of a relative luminance value of the feature point extracted in a BF. Further, the imaging control unit 220 determines the exposure condition in a BF on the basis of a relative luminance value of the feature point extracted in a DF. Specifically, the exposure condition is determined as follows.

The imaging control unit 220 determines the exposure condition in each frame in such a way that a luminance range of a BF and a luminance range of a DF overlap each other, in other words, in such a way that an identical feature point is extracted from a BF and a DF. For example, the imaging control unit 220 determines the exposure amount in a BF on the basis of the exposure amount in a DF. Specifically, the imaging control unit 220 is able to determine the exposure condition, by calculating, regarding a BF and a DF, an absolute luminance value of each feature point on the basis of a relative luminance value of the feature point and comparing the absolute luminance value of the feature point between the frames. Note that the absolute luminance value of a feature point can be calculated by a predetermined operation using the relative luminance value of the feature point.

The movement control unit 230 controls movement of the UAV. The movement control unit 230 controls flight of the UAV on the basis of the self-location estimated by the SLAM unit 210 and the map information generated by the SLAM unit 210. For example, the movement control unit 230 executes flight control, such as avoiding an obstacle indicated by the map information in order to prevent collision therewith, or continuing to image an object to be imaged in such a way as not to deviate from an imaging range.

Figure 6:
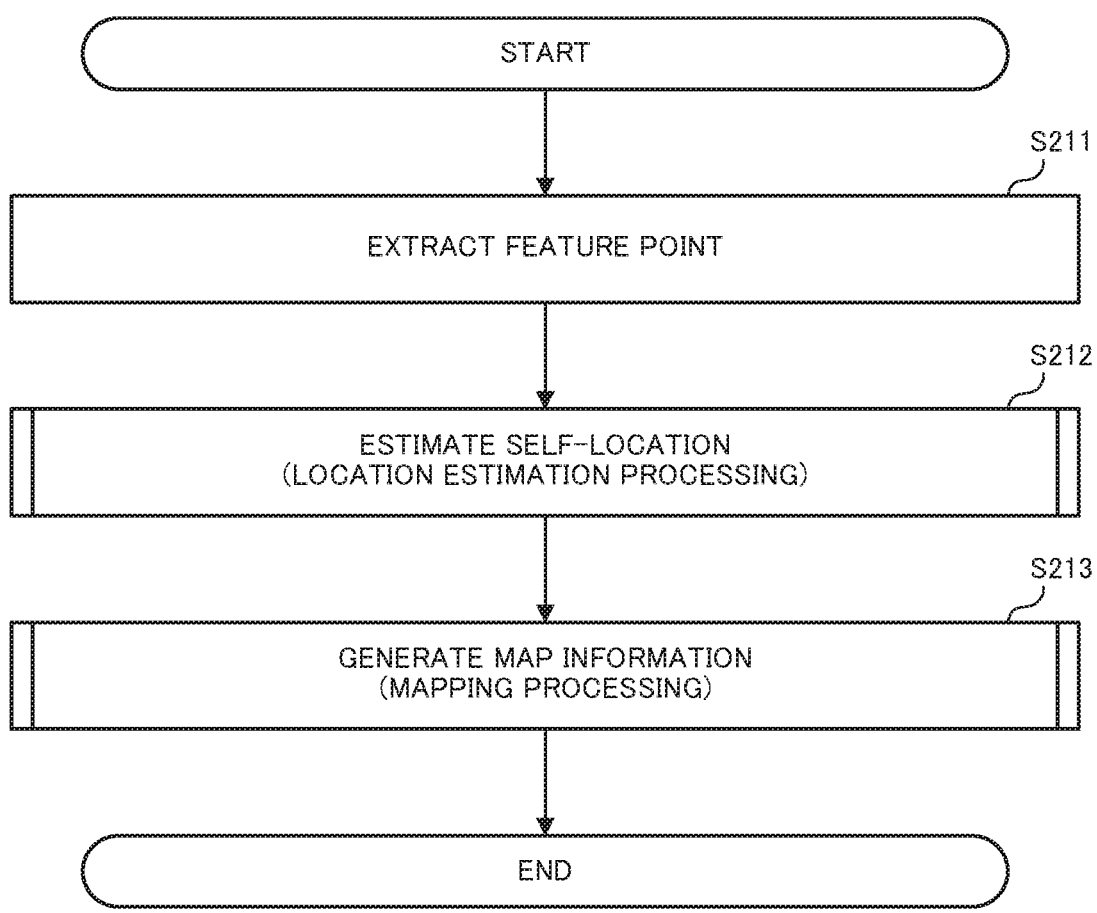
FIG. 6 is a flowchart illustrating one example of an operation of a SLAM unit.

FIG. 6 is a flowchart illustrating an operation of the SLAM unit 210. Hereinafter, a series of processing illustrated in FIG. 6 will be also referred to as "SLAM processing". Note that the SLAM processing is executed in a similar way in both of a BF and a DF. The SLAM unit 210 repeatedly executes the processing in FIG. 6 during execution of imaging by the imaging unit 200.

In Step S211, the feature point extraction unit 211 extracts a feature point from a frame to be processed. Note that the feature point extraction unit 211 executes extraction of a feature point for every frame. In Step S212, the location estimation unit 212 estimates a self-location on the basis of the feature point extracted in Step S211 and map information. In Step S213, the map generation unit 213 generates (updates) map information on the basis of the feature point extracted in Step S211 and the self-location estimated in Step S212.

Figure 7:
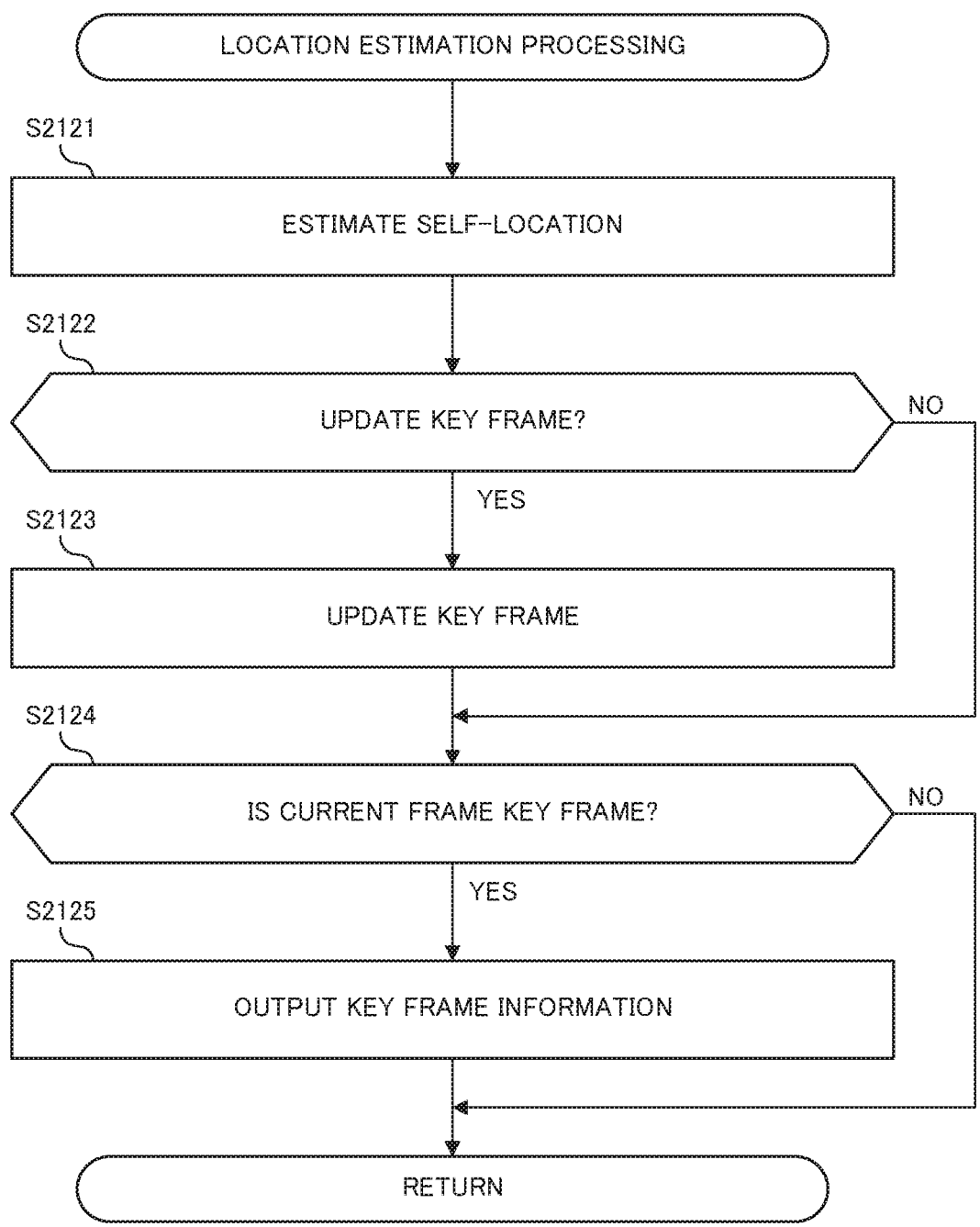
FIG. 7 is a flowchart illustrating one example of location estimation processing.

FIG. 7 is a flowchart illustrating details of the processing (hereinafter, also referred to as "location estimation processing") in Step S212. The location estimation unit 212 executes this location estimation processing for every frame. Note that it is assumed herein that a first key frame in video data is a first frame to start imaging.

In Step S2121, the location estimation unit 212 estimates a self-location on the basis of the feature point extracted in Step S211 and map information. The estimation of the self-location in Step S2121 is one of elemental techniques of SLAM. Specifically, the location estimation unit 212 estimates where the self-location is in a map, by comparing the feature point extracted in Step S211 with a feature point recorded in the map information.

In Step S2122, the location estimation unit 212 determines whether to update a key frame. Specifically, the location estimation unit 212 compares the self-location in a current frame with the self-location in an immediately preceding key frame, and determines whether displacement of the self-location is equal to or greater than a predetermined threshold value.

When displacement of the self-location is equal to or greater than a predetermined threshold value (S2122: YES), the location estimation unit 212 executes Step S2123. On the other hand, when displacement of the self-location is less than a predetermined threshold value (S2122: NO), the location estimation unit 212 skips (omits) Step S2123. In Step S2123, the location estimation unit 212 updates the key frame. Specifically, the location estimation unit 212 sets the current frame as a new key frame.

In Step S2124, the location estimation unit 212 determines whether the current frame is a key frame. For example, when the key frame has been updated in Step S2123, the location estimation unit 212 determines the current frame as being a key frame. Alternatively, the location estimation unit 212 determines the first frame to start imaging as being a key frame. On the other hand, when the current frame is not the first frame and has not been updated in Step S2123, the location estimation unit 212 determines the current frame as not being a key frame.

When the current frame is a key frame (S2124: YES), the location estimation unit 212 executes Step S2125. On the other hand, when the current frame is not a key frame (S2124: NO), the location estimation unit 212 skips Step S2125. In Step S2125, the location estimation unit 212 outputs, as key frame information, location information indicating the self-location estimated in the current frame and feature point information indicating a location of the feature point extracted in the current frame. In other words, the key frame information is output for each key frame, rather than for each frame.

Figure 8:
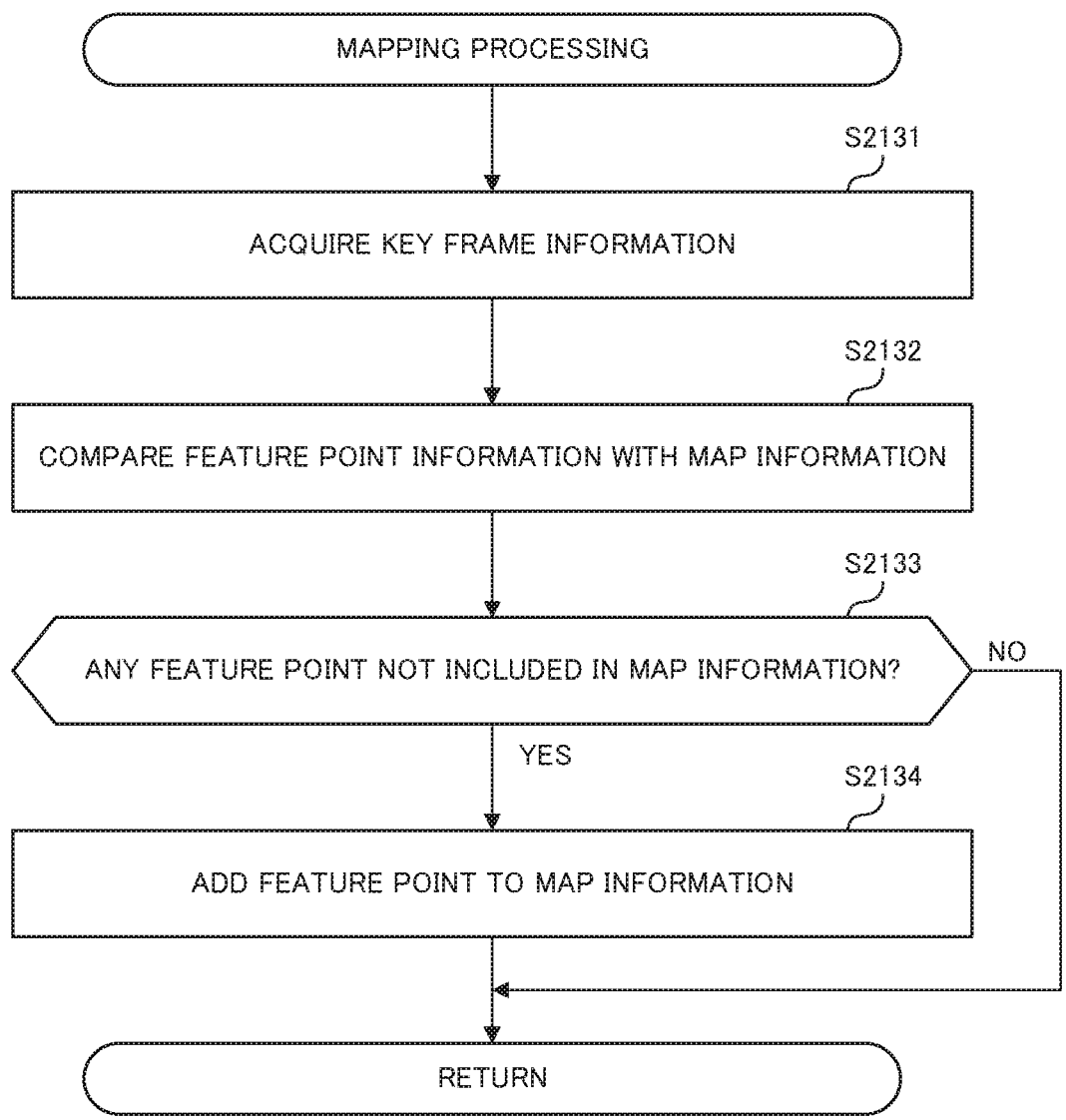
FIG. 8 is a flowchart illustrating one example of mapping processing.

FIG. 8 is a flowchart illustrating details of the processing (hereinafter, also referred to as "mapping processing") in Step S213. According to the present example embodiment, the mapping processing is processing executed on the basis of the key frame information. Thus, the mapping processing is executed for each key frame, rather than for each frame. Executing the mapping processing for each key frame makes it possible to prevent data amount of map information and processing amount required for recording the map information from increasing more than needed. Note that the mapping processing is one of elemental techniques of SLAM.

In Step S2131, the map generation unit 213 acquires the key frame information output by the location estimation unit 212. In Step S2132, the map generation unit 213 compares the feature point information included in the key frame information acquired in Step S2131 with existing map information. The feature point information may include, in a mixed way, a feature point included in the map information and a feature point not included in the map information.

In Step S2133, the map generation unit 213 determines whether there is any feature point not included in the map information among the feature points indicated by the feature point information. When there is a feature point not included in the map information (S2133: YES), the map generation unit 213 executes Step S2134. On the other hand, when there is no feature point not included in the map information (S2133: NO), the map generation unit 213 skips Step S2134.

In Step S2134, the map generation unit 213 adds, to the map information, a feature point not included in the map information among the feature points represented by the feature point information included in the key frame information. Further, at this time, the map generation unit 213 may additionally record a history of the self-location (that is, a path of the UAV) in the map information.

Note that the location estimation unit 212 and the map generation unit 213 may execute the location estimation processing and the mapping processing while operating in parallel. In other words, the location estimation unit 212 is able to estimate the self-location on the basis of the map information sequentially updated by the map generation unit 213. Further, the map generation unit 213 is able to update the map information on the basis of the key frame information sequentially supplied by the location estimation unit 212.

Figure 9:
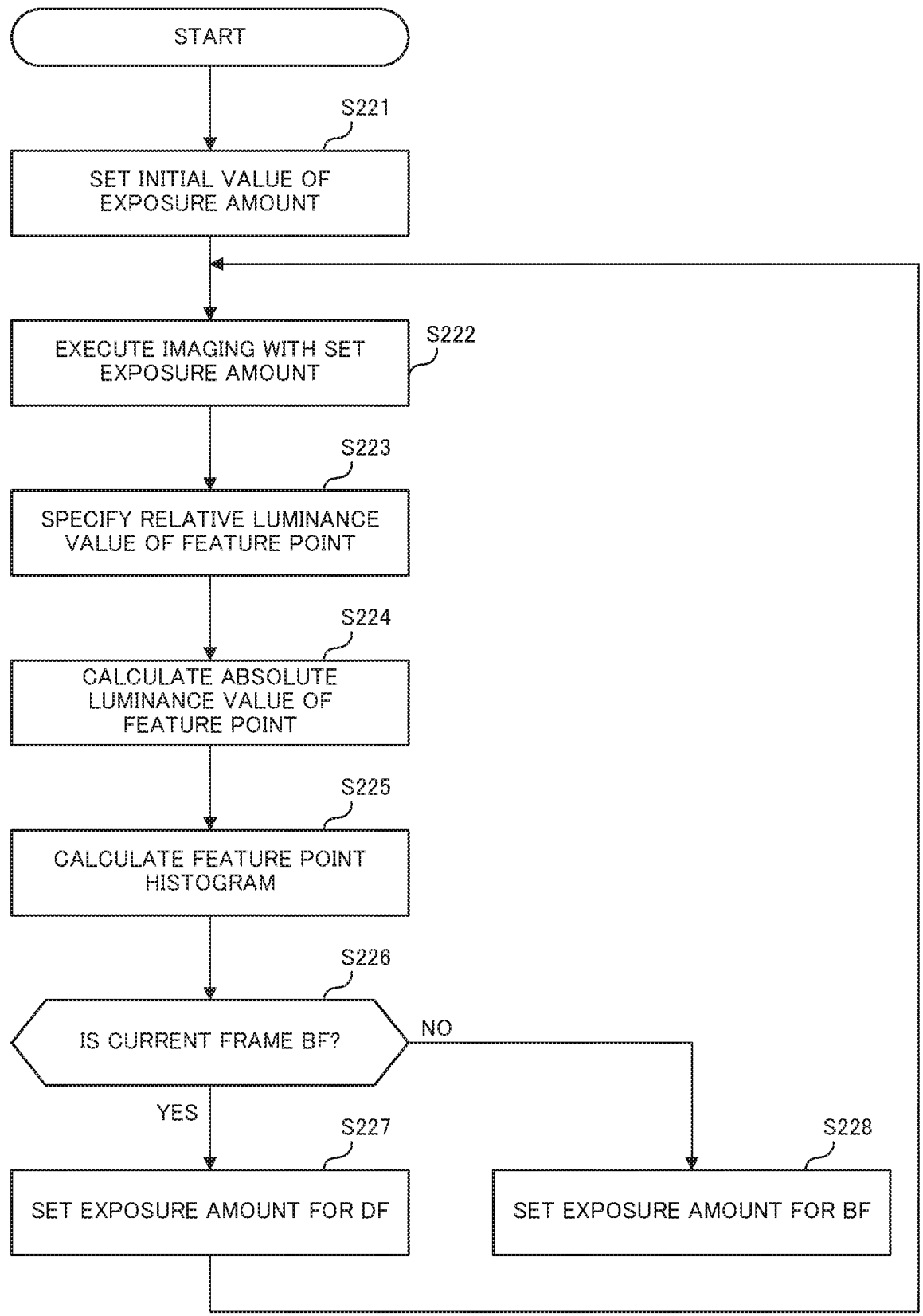
FIG. 9 is a flowchart illustrating one example of an operation of an imaging control unit.

FIG. 9 is a flowchart illustrating an operation of the imaging control unit 220. The imaging control unit 220 executes processing in FIG. 9 when the SLAM unit 210 executes the SLAM processing. In other words, the SLAM unit 210 and the imaging control unit 220 execute the processing in FIG. 6 and the processing in FIG. 9, respectively, while operating in parallel. The imaging control unit 220 repeatedly executes the processing in FIG. 9 during execution of imaging by the imaging unit 200.

In Step S221, the imaging control unit 220 sets an initial value of an exposure amount. This initial value is a predetermined numerical value associated with either of a BF or a DF. For convenience of description, it is assumed herein that the initial value of the exposure amount is a numerical value associated with a BF.

In Step S222, the imaging control unit 220 causes the imaging unit 200 to execute imaging with the exposure amount set in Step S221, S227, or S228. In other words, the imaging control unit 220 controls the imaging unit 200 in such a way that imaging is performed with the exposure amount set in Step S221, S227, or S228. For example, when Step S222 is executed next to Step S221, the imaging unit 200 executes imaging with the exposure amount equivalent to a BF.

In Step S223, the imaging control unit 220 specifies a relative luminance value of a feature point extracted from a frame captured according to Step S222. More specifically, the imaging control unit 220 specifies a relative luminance value of the feature point extracted in Step S211 of the SLAM processing. Herein, the relative luminance value is a luminance value itself of a feature point included in a frame to be processed, that is, a current frame.

In Step S224, the imaging control unit 220 calculates an absolute luminance value of a feature point extracted from a frame captured according to Step S222. The imaging control unit 220 calculates the absolute luminance value of a certain feature point, by performing a predetermined operation using the relative luminance value of the feature point and the exposure amount set at a time of capturing the current frame.

In Step S225, the imaging control unit 220 calculates a feature point histogram by using the absolute luminance value calculated in Step S224. The feature point histogram described herein indicates distribution of absolute luminance values of feature points extracted from the current frame, like the histogram in FIG. 3 according to the first example embodiment. The imaging control unit 220 temporarily stores the calculated feature point histogram in a predetermined storage area. The imaging control unit 220 individually stores the feature point histogram of BFs and the feature point histogram of DFs. The feature point histogram according to the present example embodiment is equivalent to one example of the video-related information according to the first example embodiment.

Note that a pixel having an absolute luminance value outside the luminance range of the imaging control unit 220 is recorded as a blown-out highlight or a blocked-up shadow. In other words, such a pixel has a relative luminance value of the minimum value (0 in the case of 8-bit output) or the maximum value (255 in the case of 8-bit output). Thus, in Step S225, the imaging control unit 220 may calculate the feature point histogram after excluding the relative luminance value indicating the maximum value or the minimum value. This makes it possible to eliminate influence of the blown-out highlight or the blocked-up shadow from the feature point histogram.

In Step S226, the imaging control unit 220 determines whether the current frame is a BF or a DF. When the current frame is a BF (S226: YES), the imaging control unit 220 executes Step S227. Further, when the current frame is a DF (S226: NO), the imaging control unit 220 executes Step S228. Both of Steps S227 and S228 are processing of setting an exposure amount in a frame next to the current frame.

In Step S227, the imaging control unit 220 sets an exposure amount for a DF. The imaging control unit 220 sets the exposure amount for a DF on the basis of the feature point histogram of BFs. Specifically, the imaging control unit 220 sets the exposure amount for a DF in such a way that the luminance range of the current frame (a BF in this case) and the luminance range of the next frame (a DF in this case) overlap each other, and that a predetermined number or more of common feature points can be extracted from both of the frames.

Note that it is assumed herein that a relationship between an exposure amount and a range of absolute luminance values that can be imaged with the exposure amount is known. In other words, when an exposure amount of the imaging unit 200 is determined, a luminance range of an image captured at the time is uniquely determined. Thus, it can be said herein that setting an exposure amount has the substantially same meaning as setting an upper limit and a lower limit of a luminance range. However, it is assumed that the width itself of a luminance range is constant.

In Step S228, the imaging control unit 220 sets an exposure amount for a BF. The imaging control unit 220 sets the exposure amount for a BF on the basis of the feature point histogram of DFs. Specifically, the imaging control unit 220 sets the exposure amount for a BF in such a way that the luminance range of the current frame (a DF in this case) and the luminance range of the next frame (a BF in this case) overlap each other, and that a predetermined number or more of common feature points can be extracted from both of the frames.

After Step S227 or S228, the imaging control unit 220 executes Step S222. The imaging unit 200 applies the exposure amount set in Step S227 or S228 to the next frame. The next frame described herein is a DF after Step S227, and is a BF after Step S228.

The imaging control unit 220 repeats such processing until imaging performed by the imaging unit 200 ends. Accordingly, the video data include alternately repeated BFs and DFs. In other words, the video data include one frame captured under a bright exposure condition followed by another one frame captured under a dark exposure condition, and one frame captured under a dark exposure condition followed by another one frame captured under a bright exposure condition.

As described above, the autonomous mobile system 20 according to the present example embodiment has a configuration of determining an exposure condition of a BF on the basis of the luminance information acquired in the video processing on a DF. Further, the autonomous mobile system 20 has a configuration of determining an exposure condition of a DF on the basis of the luminance information acquired in the video processing on a BF. Further, a BF and a DF are alternately repeated, according to the present example embodiment. Such a configuration makes it possible to extract the same feature point from preceding and subsequent frames, when switching is performed from a BF to a DF or from a DF to a BF. Accordingly, the autonomous mobile system 20 can exhibit an operational effect similar to the location estimation device 10 according to the first example embodiment.

Further, the autonomous mobile system 20 according to the present example embodiment is able to determine an exposure amount on the basis of a feature point histogram. Since the UAV performs imaging while moving, a captured scene may change from moment to moment. Thus, the distribution of absolute luminance values within an imaging range may also change from moment to moment. However, the distribution of absolute luminance values may change during imaging, like a scene gradually becomes brighter or darker. The autonomous mobile system 20 is able to vary the exposure amount according to the distribution of absolute luminance values of feature points within a frame, by calculating a feature point histogram and determining the exposure amount on the basis of the calculated feature point histogram. Thus, the autonomous mobile system 20 is able to allow the exposure amount to follow a change of a scene. Accordingly, the autonomous mobile system 20 can reduce a risk of failing in the SLAM processing, even in a scene with a drastic luminance change.

Further, in the autonomous mobile system 20 according to the present example embodiment, a BF and a DF are repeated alternately, that is, frame by frame. Accordingly, displacement of the UAV between a BF and a DF is reduced in comparison with a case where a BF and a DF are not repeated alternately, and, thus, a possibility of extracting more feature points increases. This is because, when a time difference between a BF and a DF is large, a possibility of being unable to extract the same feature point from both of the frames increases, since the UAV performs imaging while moving. On the other hand, when a frame rate is sufficiently high compared with a movement speed of the UAV, a difference in the self-location of the UAV between two successive frames is as small as can be ignored. Thus, the autonomous mobile system 20 can improve precision of the SLAM processing, that is, precision of location estimation and precision of map information.

Third Example Embodiment

Figure 10:
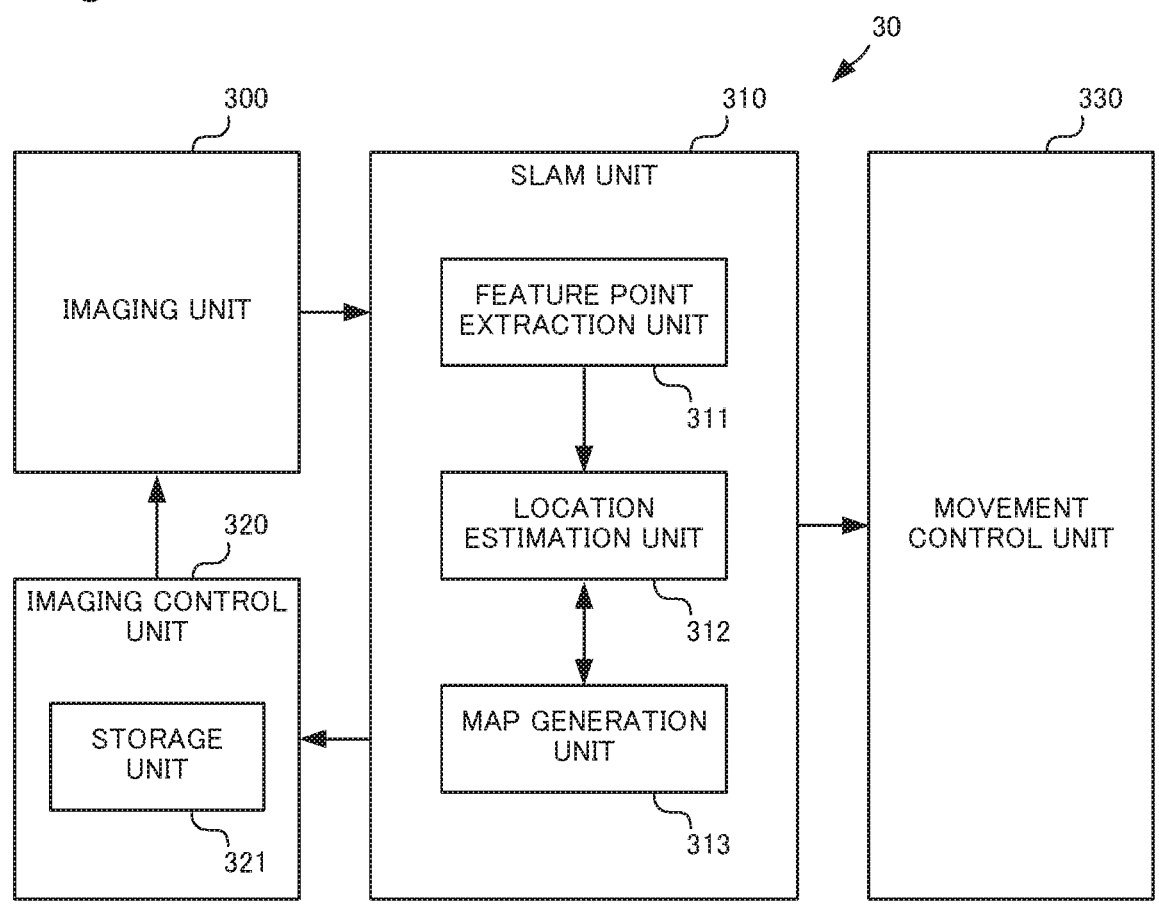
FIG. 10 is a block diagram illustrating another example of a configuration of an autonomous mobile system.

FIG. 10 is a block diagram illustrating a configuration of an autonomous mobile system 30 according to still another example embodiment. The autonomous mobile system 30 includes an imaging unit 300, a SLAM unit 310, an imaging control unit 320, and a movement control unit 330. The SLAM unit 310 includes, more specifically, a feature point extraction unit 311, a location estimation unit 312, and a map generation unit 313.

The autonomous mobile system 30 has a configuration similar to the autonomous mobile system 20 according to the second example embodiment, except for some points. Specifically, the autonomous mobile system 30 is different from the autonomous mobile system 20 in that the autonomous mobile system 30 uses history information for imaging control. More specifically, the autonomous mobile system 30 is different from the autonomous mobile system 20 regarding the following configuration.

The imaging control unit 320 includes a storage unit 321 that stores history information. The history information indicates a history of absolute luminance values of frames in video data. It can be also said that the history information indicates how a scene has changed during imaging performed by the imaging unit 300. The imaging control unit 320 may be configured in such a way that absolute luminance values of all frames after the imaging unit 300 starts imaging are stored in the storage unit 321. However, the imaging control unit 320 may be configured in such a way that only absolute luminance values of frames of a most-recent certain period are stored in the storage unit 321 and old information is discarded.

The history information may be data including absolute luminance values and coordinates associated therewith, but may be a histogram of absolute luminance values. In other words, the history information will suffice as long as the history information is capable of specifying a tendency of luminance of each frame, that is, what brightness of a scene the frames constitute as a whole.

Hereinafter, it is assumed that the storage unit 321 stores, as the history information, a histogram of absolute luminance values of frames. A function of calculating a histogram of absolute luminance values may be included in either of the SLAM unit 310 and the imaging control unit 320.

For example, when the SLAM unit 310 calculates a histogram of absolute luminance values, the feature point extraction unit 311 first calculates absolute luminance values of pixels composing an image, on the basis of relative luminance values of the pixels. Next, the feature point extraction unit 311 calculates a histogram by using the absolute luminance values of the pixels, and supplies the calculated histogram to the imaging control unit 320 for each frame. The imaging control unit 320 records the histogram supplied from the feature point extraction unit 311 in the storage unit 321.

On the other hand, when the imaging control unit 320 calculates a histogram of absolute luminance values, the feature point extraction unit 311 supplies relative luminance values of pixels composing an image to the imaging control unit 320. The imaging control unit 320 calculates a histogram of absolute luminance values on the basis of the relative luminance values of the pixels supplied from the feature point extraction unit 311.

The imaging control unit 320 is able to specify a temporal change in absolute luminance values, by referring to the history information. In other words, the imaging control unit 320 is able to specify how a scene has changed in a video, by referring to the history information. For example, the imaging control unit 320 is able to specify that a scene has become brighter or darker as a whole, on the basis of the history information.

Further, the imaging control unit 320 is able to reset an exposure condition by using such history information. The resetting described herein is, for example, changing each of exposure amounts for a BF and a DF into a predetermined value (for example, an initial value). For example, the imaging control unit 320 resets the exposure condition when the number of feature points (or a change thereof) extracted by the feature point extraction unit 311 satisfies a predetermined condition. Alternatively, the imaging control unit 320 may reset the exposure condition when absolute luminance values indicate predetermined distribution (in other words, when a histogram of absolute luminance values is a curved line of a predetermined shape).

As one example, the imaging control unit 320 resets the exposure condition when the number of feature points extracted by the feature point extraction unit 311 has decreased with time (for example, when the number of feature points extracted by the feature point extraction unit 311 has decreased by a predetermined proportion or more within a predetermined period), or when the number of feature points extracted by the feature point extraction unit 311 becomes equal to or less than a predetermined threshold value. In other words, the imaging control unit 320 resets the exposure condition when the number of feature points extracted by the feature point extraction unit 311 decreases and a possibility of failing in location estimation increases.

FIGS. 11A to 11D are diagrams illustrating one example of imaging control, that is, resetting of an exposure condition according to the present example embodiment. The histograms illustrated in FIGS. 11A to 11D individually indicate absolute luminance values of an entire scene in a virtual way. These histograms indicate a time-series change of the absolute luminance values of the entire scene. In other words, the histogram $H_b$ is a histogram of the scene later than the histogram $H_a$. Further, the histogram $H_c$ is a histogram of the scene later than the histogram $H_b$. Further, the histogram $H_d$ is a histogram of the scene later than the histogram $H_c$. Further, the BF and the DF in the drawing individually indicate a luminance range (that is, a range of absolute luminance values that can be imaged) of a BF or a DF in each scene. Note that, the absolute luminance values to be recorded as the history information are not the entire illustrated histogram, but only the absolute luminance values included in the range of the BF or the DF in the drawing.

The scene exemplified by using FIGS. 11A to 11D is such a scene that has two peaks of absolute luminance values and has an area equivalent to the bright-side peak gradually deviating from an imaging range. According to the present example embodiment, when such a scene is captured, the luminance ranges of the BF and the DF gradually shift to the bright side at first (see FIGS. 11A and 11B).

However, since the luminance range of the imaging unit 300 is finite, the luminance range of the BF does not become brighter than a certain value. On the other hand, the scene gradually changes, and the area equivalent to the bright-side peak deviates from the imaging range (see FIGS. 11B and 11C). Then, even when overlapping between the luminance range of the BF and the luminance range of the DF increases, feature points extracted from both of the frames do not increase so much. Further, merely continuing to follow the change of the scene also causes a possibility of being unable to extract a sufficient number of feature points from both of the BF and the DF.

In view of the above, the imaging control unit 320 resets an exposure condition when a captured scene undergoes such a change. Specifically, the imaging control unit 320 resets the exposure condition on the basis of an absolute luminance value of a frame, out of the BF and the DF, having a larger number of feature points extracted by the feature point extraction unit 311. In the case of the example in FIG. 11C, the imaging control unit 320 changes the exposure condition in a direction in which a relative luminance value becomes smaller (that is, an exposure amount decreases).

Figure 11A:
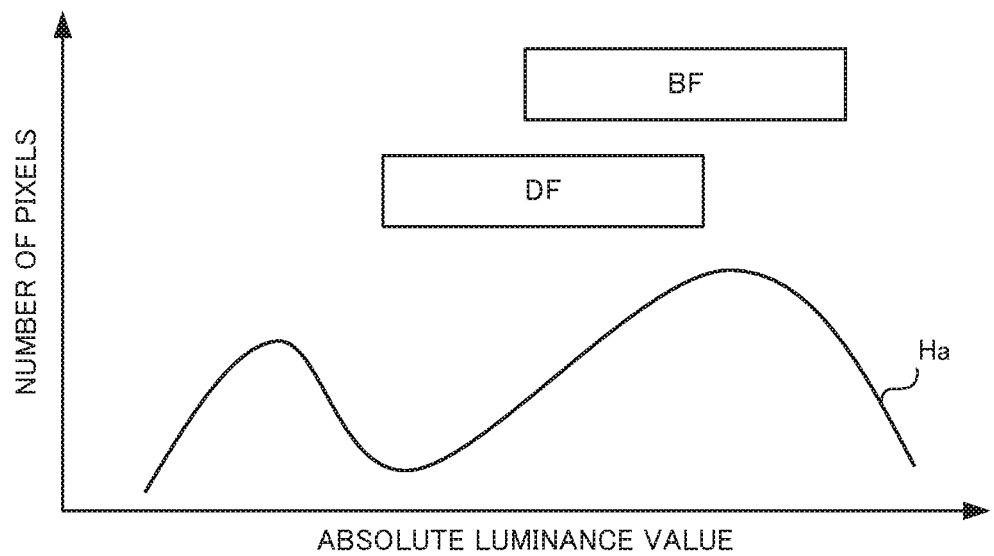
FIG. 11A is a diagram illustrating a first example of resetting an exposure condition (first scene).
Figure 11B:
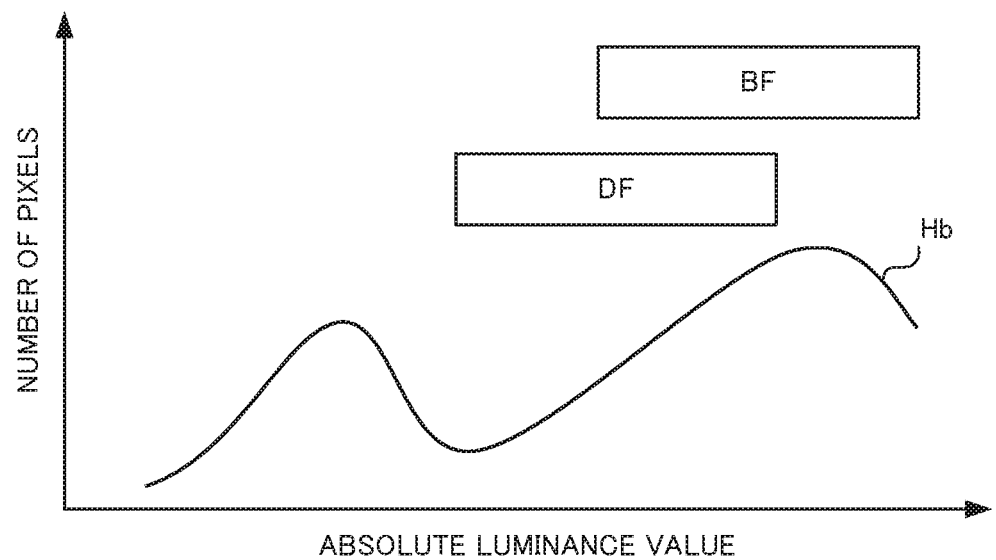
FIG. 11B is a diagram illustrating the first example of resetting an exposure condition (second scene).
Figure 11C:
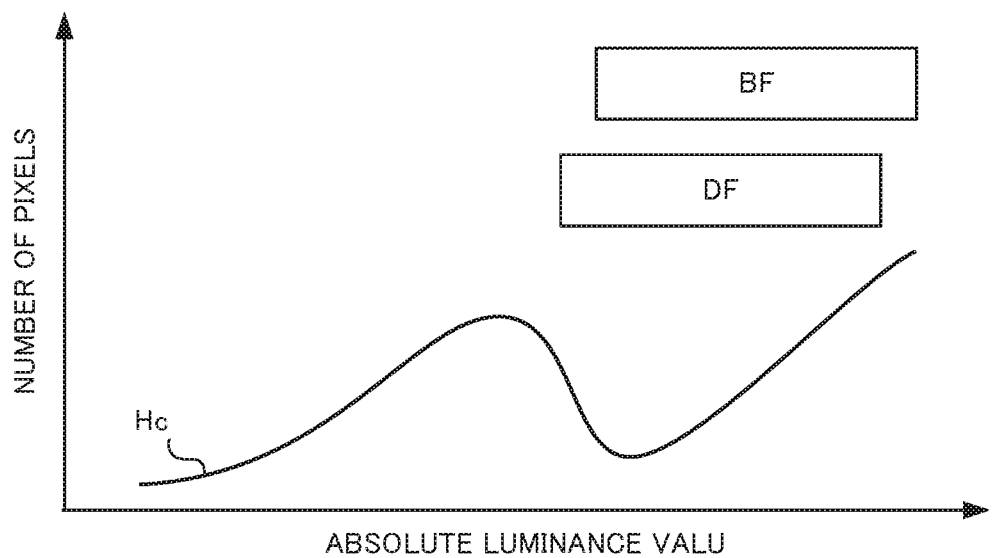
FIG. 11C is a diagram illustrating the first example of resetting an exposure condition (third scene).
Figure 11D:
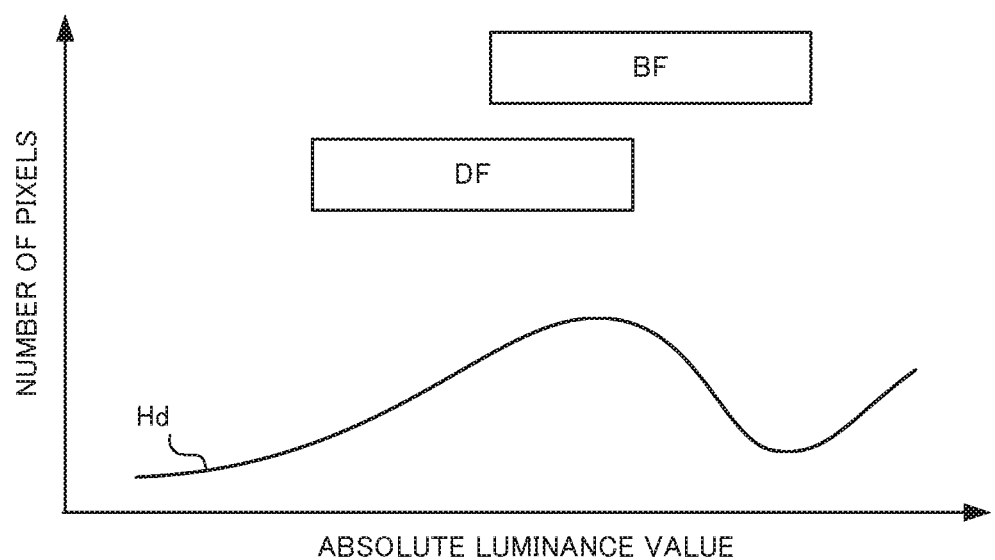
FIG. 11D is a diagram illustrating the first example of resetting an exposure condition (fourth scene).

Then, the luminance ranges of the BF and the DF change into a certain range according to an initial value (see FIG. 11D), unlike the previous change following the change of the scene (see FIGS. 11A to 11C). This allows the luminance ranges of the BF and the DF to change in such a way as to follow the change of the scene again. Thus, the imaging control unit 320 can strengthen location estimation against the change of the scene.

Figure 12A:
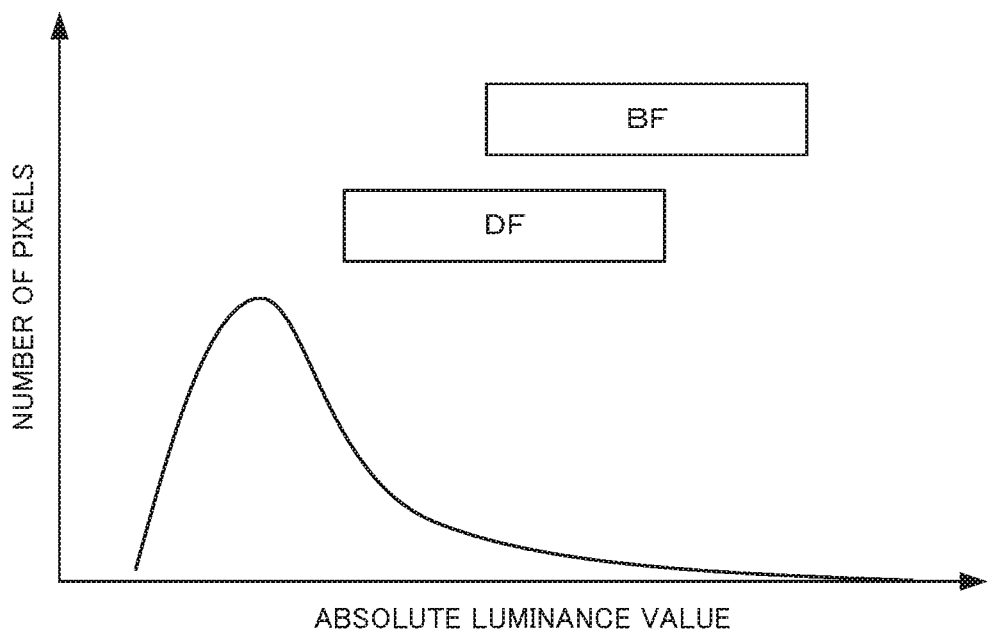
FIG. 12A is a diagram illustrating a second example of resetting an exposure condition (before resetting).
Figure 12B:
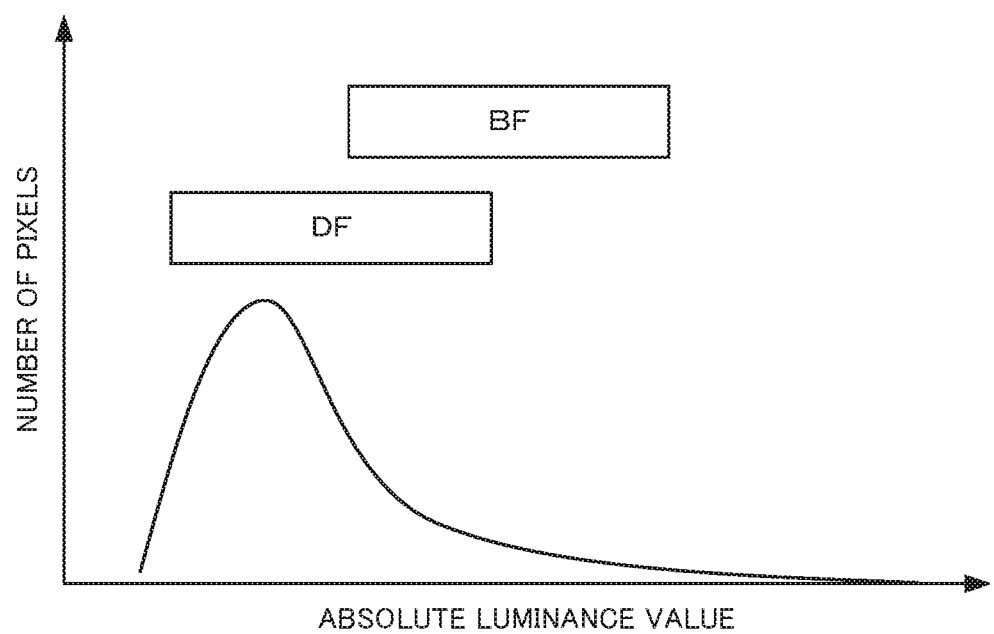
FIG. 12B is a diagram illustrating the second example of resetting an exposure condition (after resetting).

FIGS. 12A and 12B are diagrams illustrating another example of imaging control according to the present example embodiment. The histograms illustrated in FIGS. 12A and 12B individually indicate absolute luminance values of an entire scene, similarly to the histograms illustrated in FIGS. 11A to 11D. Further, the BF and the DF in the drawing individually indicate a luminance range (that is, a range of absolute luminance values that can be imaged) of a BF or a DF in each scene.

In the example in FIG. 12A, it is assumed that the imaging control unit 320 has a small number of feature points extracted by the feature point extraction unit 311, and the number is equal to or less than a predetermined threshold value. When imaging control (see FIG. 9) according to the second example embodiment is executed in a case where a histogram of absolute luminance values is biased as described above, the luminance ranges of the BF and the DF gradually shift to a peak position of the histogram. However, it takes time before the luminance ranges of the BF and the DF shift to the peak position and a sufficient number of feature points can be extracted from both of the frames.

In such a case, the imaging control unit 320 resets an exposure condition on the basis of the history information. Specifically, when the number of feature points extracted by the feature point extraction unit 311 is equal to or less than a predetermined threshold value, the imaging control unit 320 changes the exposure condition in a direction in which more feature points are extracted (a direction in which an exposure amount decreases, in the case of this example), on the basis of the absolute luminance values of the BF and the DF.

Then, the luminance ranges of the BF and the DF shift as illustrated in FIG. 12B. This allows the feature point extraction unit 311 to extract a sufficient number of feature points with less time required than in a case where imaging control according to the second example embodiment is executed. Accordingly, the imaging control unit 320 can strengthen location estimation against the change of the scene.

Modification Example

Modifications are applicable to the above-described first to third example embodiments, for example, as follows. These modification examples can be also combined appropriately as needed. Further, a modification example described by using a particular example embodiment may be applied to another example embodiment as long as no inconsistency is caused.

(1) The video processing unit 110 may calculate an optical flow on the basis of a video. The optical flow represents a motion of an object included in the video. The video processing unit 110 is able to estimate a movement direction of an imaging range (in other words, a movement direction of the imaging unit 100) on the basis of the optical flow. Note that a method of calculating the optical flow may be any well-known method, and is not particularly limited.

The imaging control unit 120 may determine the exposure condition on the basis of the video-related information and brightness of a pixel being in the movement direction of the imaging range estimated by the video processing unit 110. For example, the imaging control unit 120 corrects the exposure condition determined in Step S12, on the basis of brightness of a pixel being in the movement direction of the imaging range estimated by the video processing unit 110.

As one example, in such a case where a proportion of a bright area in the imaging range becomes gradually larger, it can be said that the imaging unit 100 captures a scene with a gradually increasing number of bright objects, or moves from a dark place toward a bright place. For example, a video in such a case where an object on which the imaging unit 100 is mounted moves from inside of a tunnel to an exit becomes brighter with time. In such a case, the imaging control unit 120 decreases the exposure amount in such a way that a feature point can be extracted even from the brighter image.

Note that the optical flow calculated from a video may include an object different from the movement direction of the imaging range. For example, when a video includes an object such as an automobile or a human, the optical flow associated with this object indicates a motion different from the optical flow as a whole scene. The video processing unit 110 may reduce influence that a moving object in a scene gives on estimation of a movement direction, by ignoring such an optical flow.

(2) The map information may be generated by the SLAM processing, or may be generated and recorded in advance. When the map information is recorded in advance, the SLAM unit 210 does not need to execute the mapping processing. In other words, the SLAM unit 210 executes the location estimation processing on the basis of the map information recorded in advance in a predetermined storage area. Note that such map information may be generated by using an imaging system different from the autonomous mobile system 20.

(3) The map information may include, in addition to information (hereinafter, also referred to as "first information") indicating a location and a feature amount of a plurality of feature points, information (hereinafter, also referred to as "second information") indicating brightness of the plurality of feature points. The second information is, for example, information indicating an absolute luminance value of a feature point. The second information may be information representing the absolute luminance value of the feature point by using a histogram.

The second information may be recorded in advance similarly to the map information, or may be generated by the location estimation unit 212 and supplied as a part of the key frame information to the map generation unit 213. When the second information is included in the map information recorded in advance, an approximate exposure condition necessary for extraction of a feature point is predictable.

When the map information includes the second information, the imaging control unit 220 is able to determine the exposure condition on the basis of a feature point histogram (that is, the video-related information) of a BF and a DF and the second information. For example, the imaging control unit 220 may determine the exposure amount on the basis of the absolute luminance value of the feature point indicated by the second information, in such a way that the number of feature points extractable from both of the BF and the DF exceeds a certain number. This allows the imaging control unit 220 to determine the exposure condition on the basis of the second information, in the vicinity of a location on a real space where a feature point is known. Thus, the imaging control unit 220 can reduce a possibility of failing in location estimation.

Furthermore, when there are second information recorded in advance and second information generated by the location estimation unit 212, the imaging control unit 220 may execute imaging control based on a result of comparison of these pieces of second information. The second information recorded in advance indicates brightness of a feature point at a point in time when the map information recorded in advance is generated. In contrast to this, the second information generated by the location estimation unit 212 indicates brightness of a feature point at a point in time when imaging is performed by the imaging unit 200, that is, brightness at a time of imaging. Thus, when the real space represented by the map information is a space with an inconstant illumination condition such as an outdoor space, the feature points represented by these pieces of second information have a possibility of having different absolute luminance values, even though the feature points are actually the same feature points. Then, the imaging control unit 220 may be unable to set an appropriate exposure condition when determining the exposure condition on the basis of the second information, which results in causing a possibility of capturing a video from which a sufficient number of feature points cannot be extracted.

In view of the above, when there are second information recorded in advance and second information generated by the location estimation unit 212, the imaging control unit 220 may compare brightness of feature points at an identical (or substantially identical) location, and may determine the exposure condition according to a difference therebetween. For example, when a difference between an absolute luminance value (hereinafter, also referred to as a "first absolute luminance value") of a certain feature point indicated by the second information recorded in advance and an absolute luminance value (hereinafter, also referred to as a "second absolute luminance value") of the feature point supplied from the location estimation unit 212 is equal to or greater than a predetermined threshold value, the imaging control unit 220 corrects the exposure amount determined on the basis of the second information recorded in advance. More specifically, when the first absolute luminance value is brighter than the second absolute luminance value, the imaging control unit 220 corrects the exposure amount determined on the basis of the second information recorded in advance, in a decreasing direction (that is, a direction of suppressing brightness). With this configuration, the imaging control unit 220 can cause the imaging unit 200 to perform imaging with the exposure condition according to an illumination condition at a time of imaging. Thus, the imaging control unit 220 can reduce a possibility of failing in location estimation.

(5) The imaging processing performed by the imaging unit 200 and the SLAM processing may be executed independently. Alternatively, these pieces of processing may be executed synchronously. The term "synchronously" described herein indicates that a timing of executing one piece of processing depends on a timing of executing another piece of processing.

(6) The SLAM unit 210 has a possibility of failing in the SLAM processing when a location or a posture of the UAV has drastically changed, and the like. For example, when the SLAM processing associated with a certain frame is failed and a relative luminance value of a feature point cannot be acquired from the SLAM unit 210, the imaging control unit 220 is unable to determine the exposure amount of a frame next to the frame, depending on the processing in FIG. 9.

In order to cope with such a case, the imaging control unit 220 may store latest values of the exposure amounts for a BF and a DF. Then, when the SLAM processing is failed, the imaging control unit 220 sets the exposure amount by using the latest value of the exposure amount for a BF or a DF.

FIG. 13 illustrates a procedure of setting the exposure amount when the SLAM processing is failed. Herein, F1 to F5 mean frame numbers. Further, E1 to E5 mean exposure amounts in frames F1 to F5. Note that it is assumed herein that the frames F1, F3, and F5 are BFs. Further, it is assumed herein that the frames F2 and F4 are DFs.

The frame F1 is captured by using an initial value of the exposure amount (see Step S221 in FIG. 9). In other words, the exposure amount E1 is equivalent to this initial value. The exposure amount E2 of the frame F2 is determined on the basis of a relative luminance value of a feature point extracted from the frame F1. At this time, the imaging control unit 220 stores E1 as a latest value of the exposure amount for a BF, and stores E2 as a latest value of the exposure amount for a DF, respectively.

Similarly, the exposure amount E3 of the frame F3 is determined on the basis of a relative luminance value of a feature point extracted from the frame F2, and the exposure amount E4 of the frame F4 is determined on the basis of a relative luminance value of a feature point extracted from the frame F3. The imaging control unit 220 updates the latest value of the exposure amount for a BF or a DF every time the exposure amount is determined. For example, at a point in time of determining the exposure amount E4, the imaging control unit 220 stores E3 as a latest value of the exposure amount for a BF, and stores E4 as a latest value of the exposure amount for a DF, respectively.

Herein, it is assumed that the SLAM processing associated with the frame F4 is failed and a relative luminance value of a feature point cannot be acquired. In such a case, the imaging control unit 220 uses the latest value of the exposure amount for a BF, that is, E3, as the exposure amount E5 of the frame F5. With this configuration, the imaging control unit 220 can continue exposure control without interruption, even when the SLAM processing is failed temporarily.

(7) The self-location estimated by the SLAM processing may include an error due to the exposure amount. For example, when imaging is executed with the exposure amount for a BF and the exposure amount for a DF alternately as according to the second example embodiment, there is a possibility of generating a systematic error between the self-location estimated in a BF and the self-location estimated in a DF.

FIG. 14 illustrates one example of the error in the self-location due to the exposure amount. Herein, F1 to F5 mean frame number. Further, P1 to P5 mean self-locations estimated in frames F1 to F5. Note that it is assumed herein that the frames F1, F3, and F5 are BFs. Further, it is assumed herein that the frames F2 and F4 are DFs.

It is assumed the UAV actually moves along a locus of an arrow in the drawing. In other words, in this example, errors are generated in the self-locations P1 to P5. These errors indicate different tendencies between the BFs and the DFs. Note that likeliness of generating such an error may differ depending on an algorithm of extracting a feature point or an object to be imaged.

When such an error is generated, the SLAM unit 210 (the map generation unit 213) may synthesize a location of the imaging unit 200 on the basis of the self-location estimated in two or more frames. More specifically, the SLAM unit 210 records the self-location estimated from a BF and the self-location estimated from a DF as separate pieces of map information, and corrects the self-location by synthesizing these pieces of map information. The synthesis described herein is, for example, processing of calculating a mean value of coordinates of temporally adjacent two or more self-locations and regarding this mean value as post-correction coordinates.

Herein, the SLAM unit 210 may execute correction in accordance with weighting according to reliability of the self-location. For example, the SLAM unit 210 may calculate the post-correction coordinates by using a weighted mean according to reliability of the self-location. The reliability described herein is determined on the basis of, for example, the number of feature points extracted from each frame. Specifically, the coordinates of the self-location estimated on the basis of a frame having a larger number of extractable feature points has higher reliability (that is, has fewer errors).

(8) The imaging unit 100 may be configured by a plurality of imaging elements mounted on a single object. For example, the imaging unit 100 may be configured to include imaging elements for a BF and imaging elements for a DF. Alternatively, the imaging unit 100 may be configured to include an imaging area (one or a plurality of cells) for a BF and an imaging area for a DF on a single imaging element.

(9) The devices (the location estimation device 10, the autonomous mobile system 20, and the autonomous mobile system 30) according to the present disclosure include a wide variety of specific hardware configurations, and are not limited to a particular configuration. For example, the devices according to the present disclosure may be implemented by using software, or may be configured to divide various kinds of processing by using a plurality of pieces of hardware.

Figure 15:
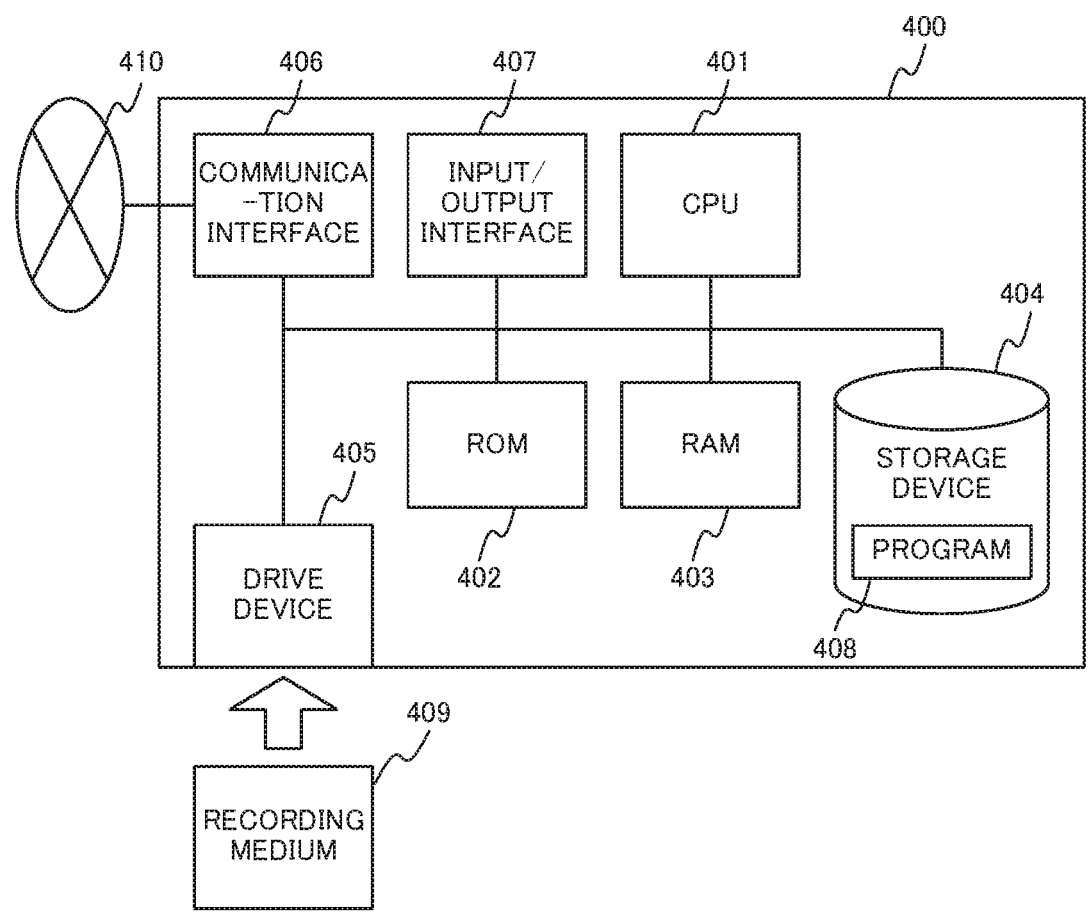
FIG. 15 is a block diagram illustrating one example of a hardware configuration of a computer device.

FIG. 15 is a block diagram illustrating one example of a hardware configuration of a computer device 400 that achieves the devices according to the present disclosure. The computer device 400 is configured to include a central processing unit (CPU) 401, a read only memory (ROM) 402, a random access memory (RAM) 403, a storage device 404, a drive device 405, a communication interface 406, and an input/output interface 407.

The CPU 401 executes a program 408 by using the RAM 403. The communication interface 406 exchanges data with an external device via a network 410. The input/output interface 407 exchanges data with peripheral equipment (an imaging device and the like). The communication interface 406 and the input/output interface 407 can function as a component for acquiring or outputting data.

Note that the program 408 may be stored on the ROM 402. Further, the program 408 may be recorded on a recording medium 409 such as a memory card and read out by the drive device 405, or may be transmitted from an external device via the network 410.

The devices according to the present disclosure may be implemented by the configurations (or a part thereof) illustrated in FIG. 15. For example, in the case of the location estimation device 10, the video processing unit 110 and the imaging control unit 120 are associated with the CPU 401, the ROM 402, and the RAM 403.

Note that the components of the devices according to the present disclosure may be configured by a single circuitry (a processor or the like), or may be configured by a combination of a plurality of circuitries. A circuitry described herein may be either of a dedicated circuitry or a general-purpose circuitry. For example, the devices according to the present disclosure may have a part implemented by a dedicated processor and may have another part implemented by a general-purpose processor. For example, the video processing unit 110 and the imaging control unit 120 may be configured by different processors.

[Supplementary Notes]

Some or all of the present disclosure can be also described as the following supplementary notes. However, the present invention is not necessarily limited to the modes of the supplementary notes.

(Supplementary Note 1)

A location estimation device including:

video processing means for executing video processing including location estimation of imaging means based on a plurality of feature points extracted from a video, the video being captured by the imaging means and composed of a plurality of frames; and imaging control means for determining, based on video-related information acquired in the video processing on a first frame belonging to a first group out of the plurality of frames, an exposure condition of the imaging means in a second frame belonging to a second group out of the plurality of frames, the second group being different from the first group.

(Supplementary Note 2)

The location estimation device according to supplementary note 1, wherein the imaging control means determines the exposure condition in such a way that a plurality of identical feature points are extracted from the first frame and the second frame.

(Supplementary Note 3)

The location estimation device according to supplementary note 1 or 2, wherein the video processing means executes the location estimation, based on map information including first information and second information, the first information indicating a location and a feature amount of the plurality of feature points, the second information indicating brightness of the plurality of feature points, and the imaging control means determines the exposure condition in the second frame, based on the video-related information and the second information.

(Supplementary Note 4)

The location estimation device according to supplementary note 3, wherein the imaging control means determines the exposure condition in the second frame, based on brightness of specific feature point indicated by the second information and brightness of the specific feature point at a time of imaging, the specific feature point being at least any of the plurality of feature points.

(Supplementary Note 5)

The location estimation device according to any one of supplementary notes 1 to 4, wherein the video processing means estimates a movement direction of an imaging range, based on an optical flow in the video, and the imaging control means determines the exposure condition in the second frame, based on the video-related information and brightness of a pixel in the movement direction being estimated.

(Supplementary Note 6)

The location estimation device according to any one of supplementary notes 1 to 5, wherein the video processing means corrects a location of the imaging means estimated by the location estimation, by using a location estimated in a frame belonging to the first group and a location estimated in a frame belonging to the second group.

(Supplementary Note 7)

The location estimation device according to supplementary note 6, wherein the video processing means corrects the location of the imaging means, according to weighting based on reliability of the location estimated in the frame belonging to the first group and the location estimated in the frame belonging to the second group.

(Supplementary Note 8)

The location estimation device according to any one of supplementary notes 1 to 7, further comprising storage means for storing history information indicating a change of a scene in the video, wherein the imaging control means resets the exposure condition in the second frame, when a predetermined condition is satisfied.

(Supplementary Note 9)

A location estimation method including:

executing video processing including location estimation of imaging means based on a plurality of feature points extracted from a video, the video being captured by the imaging means and composed of a plurality of frames; and determining, based on video-related information acquired in the video processing on a first frame belonging to a first group out of the plurality of frames, an exposure condition of the imaging means in a second frame belonging to a second group out of the plurality of frames, the second group being different from the first group.

(Supplementary Note 10)

The location estimation method according to supplementary note 9, further comprising determining the exposure condition in such a way that a plurality of identical feature points are extracted from the first frame and the second frame.

(Supplementary Note 11)

A computer-readable program recording medium that records a program for causing a computer to execute:

a step of executing video processing including location estimation of imaging means based on a plurality of feature points extracted from a video, the video being captured by the imaging means and composed of a plurality of frames; and a step of determining, based on video-related information acquired in the video processing on a first frame belonging to a first group out of the plurality of frames, an exposure condition of the imaging means in a second frame belonging to a second group out of the plurality of frames, the second group being different from the first group.

(Supplementary Note 12)

The program recording medium according to supplementary note 11, wherein the determining step determines the exposure condition in such a way that a plurality of identical feature points are extracted from the first frame and the second frame.

The present invention has been described by using each of the example embodiments described above as an exemplary example. However, the present invention is not limited to the above-described example embodiments. In other words, various modes that a person skilled in the art may understand can be applied to the present invention within the scope of the present invention.

REFERENCE SIGNS LIST

10 Location estimation device
100 Imaging unit
110 Video processing unit
120 Imaging control unit
20, 30 Autonomous mobile system
200, 300 Imaging unit
210, 310 SLAM unit
211, 311 Feature point extraction unit
212, 312 Location estimation unit
213, 313 Map generation unit
220, 320 Imaging control unit
321 Storage unit
230, 330 Movement control unit
400 Computer device

The invention claimed is:

1. A location estimation device comprising:
at least one memory storing a computer program; and
at least one processor configured to execute the computer program to:
execute video processing including location estimation of an imaging unit based on a plurality of feature points extracted from a video, the video being captured by the imaging unit and composed of a plurality of frames; and
select, based on video-related information acquired in the video processing on a first frame belonging to a first group out of the plurality of frames, an exposure condition from exposure conditions of the imaging unit in a second frame belonging to a second group out of the plurality of frames, the second group being different from the first group, the selected exposure condition satisfying that a plurality of identical feature points are extracted from the first frame and the second frame.

2. The location estimation device according to claim 1, wherein the processor is configured to execute the computer program to:

execute the location estimation, based on map information including first information and second information, the first information indicating a location and a feature amount of the plurality of feature points, the second information indicating brightness of the plurality of feature points; and determine the exposure condition in the second frame, based on the video-related information and the second information.

3. The location estimation device according to claim 2, wherein the processor is configured to execute the computer program to determine the exposure condition in the second frame, based on brightness of specific feature point indicated by the second information and brightness of the specific feature point at a time of imaging, the specific feature point being at least any of the plurality of feature points.

4. The location estimation device according to claim 1, wherein the processor is configured to execute the computer program to:

estimate a movement direction of an imaging range, based on an optical flow in the video; and determine the exposure condition in the second frame, based on the video-related information and brightness of a pixel in the movement direction being estimated.

5. The location estimation device according to claim 1, wherein the processor is configured to execute the computer program to correct a location of the imaging unit estimated by the location estimation, by using a location estimated in a frame belonging to the first group and a location estimated in a frame belonging to the second group.

6. The location estimation device according to claim 5, wherein the processor is configured to execute the computer program to correct the location of the imaging unit, according to weighting based on reliability of the location estimated in the frame belonging to the first group and the location estimated in the frame belonging to the second group.

7. The location estimation device according to claim 1, wherein the processor is configured to execute the computer program to:

store history information indicating a change of a scene in the video in a storage; and reset the exposure condition in the second frame, when a predetermined condition is satisfied.

8. A location estimation method comprising:

executing video processing including location estimation of an imaging unit based on a plurality of feature points extracted from a video, the video being captured by the imaging unit and composed of a plurality of frames; and selecting, based on video-related information acquired in the video processing on a first frame belonging to a first group out of the plurality of frames, an exposure condition from exposure conditions of the imaging unit in a second frame belonging to a second group out of the plurality of frames, the second group being different from the first group, the selected exposure condition satisfying that a plurality of identical feature points are extracted from the first frame and the second frame.

9. A non-transitory computer-readable program recording medium that records a program for causing a computer to execute:

executing video processing including location estimation of an imaging unit based on a plurality of feature points extracted from a video, the video being captured by the imaging unit and composed of a plurality of frames; and selecting, based on video-related information acquired in the video processing on a first frame belonging to a first group out of the plurality of frames, an exposure condition from exposure conditions of the imaging unit in a second frame belonging to a second group out of the plurality of frames, the second group being different from the first group, the selected exposure condition satisfying that a plurality of identical feature points are extracted from the first frame and the second frame.

* * * * *